(12) United States Patent
Zhu et al.

(10) Patent No.: US 10,854,945 B2
(45) Date of Patent: Dec. 1, 2020

(54) CIRCUITS FOR WIRELESS COMMUNICATION ON MULTIPLE FREQUENCY BANDS

(71) Applicants: Jianxun Zhu, New York, NY (US); Peter R. Kinget, Summit, NJ (US)

(72) Inventors: Jianxun Zhu, New York, NY (US); Peter R. Kinget, Summit, NJ (US)

(73) Assignee: The Trustees of Columbia University in the City of New York, New York, NY (US)

( * ) Notice: Subject to any disclaimer, the term of this patent is extended or adjusted under 35 U.S.C. 154(b) by 0 days.

(21) Appl. No.: 16/303,246

(22) PCT Filed: May 22, 2017

(86) PCT No.: PCT/US2017/033857
§ 371 (c)(1),
(2) Date: Nov. 20, 2018

(87) PCT Pub. No.: WO2017/201534
PCT Pub. Date: Nov. 23, 2017

(65) Prior Publication Data
US 2019/0207288 A1 Jul. 4, 2019

Related U.S. Application Data

(60) Provisional application No. 62/385,193, filed on Sep. 8, 2016, provisional application No. 62/339,693, filed on May 20, 2016.

(51) Int. Cl.
*H01P 5/18* (2006.01)
*H04B 1/44* (2006.01)
(Continued)

(52) U.S. Cl.
CPC ............... *H01P 5/18* (2013.01); *H01P 5/227* (2013.01); *H01Q 21/28* (2013.01); *H04B 1/00* (2013.01);
(Continued)

(58) Field of Classification Search
CPC combination set(s) only.
See application file for complete search history.

(56) References Cited

U.S. PATENT DOCUMENTS

| | | |
|---|---|---|
| 4,656,434 A | 4/1987 | Selin |
| 5,222,246 A | 6/1993 | Wolkstein |

(Continued)

FOREIGN PATENT DOCUMENTS

CN 201510104422 6/2015

OTHER PUBLICATIONS

"Spectrum Analysis Basics", Agilent Technologies Application Note 150, pp. 1-89.

(Continued)

*Primary Examiner* — Junpeng Chen
(74) *Attorney, Agent, or Firm* — Byrne Poh LLP

(57) ABSTRACT

Circuits for wireless communication on multiple frequency bands are provided. In accordance with some embodiments, transceivers are provided, the transceivers comprising: a first quadrature hybrid having a first in port, a first iso port, a first cpl port, and a first thru port; an antenna coupled to the first in port; a first transmitter having an output coupled to the first cpl port; and a first receiver having an input coupled to the first cpl port.

13 Claims, 43 Drawing Sheets

(51) Int. Cl.
| | |
|---|---|
| *H04B 1/525* | (2015.01) |
| *H04B 1/00* | (2006.01) |
| *H04B 1/52* | (2015.01) |
| *H01P 5/22* | (2006.01) |
| *H01Q 21/28* | (2006.01) |
| *H04B 1/04* | (2006.01) |
| *H04B 1/18* | (2006.01) |
| *H04L 5/00* | (2006.01) |
| *H04L 5/14* | (2006.01) |

(52) U.S. Cl.
CPC .............. *H04B 1/0458* (2013.01); *H04B 1/18* (2013.01); *H04B 1/44* (2013.01); *H04B 1/52* (2013.01); *H04B 1/525* (2013.01); *H04L 5/0023* (2013.01); *H04L 5/143* (2013.01); *H04L 5/001* (2013.01)

(56) References Cited

U.S. PATENT DOCUMENTS

| | | | |
|---|---|---|---|
| 5,412,351 | A | 5/1995 | Nystrom et al. |
| 6,111,452 | A | 8/2000 | Fazi et al. |
| 6,240,142 | B1 | 5/2001 | Kaufman et al. |
| 7,003,265 | B2 * | 2/2006 | Jeon ...................... H04B 1/1027 333/103 |
| 8,149,742 | B1 | 4/2012 | Sorsby |
| 8,306,480 | B2 * | 11/2012 | Muhammad ........... H04B 1/525 455/296 |
| 8,462,609 | B2 | 6/2013 | Berggren et al. |
| 8,514,793 | B2 | 8/2013 | Gauvreau et al. |
| 8,654,685 | B2 * | 2/2014 | Kim ...................... H04W 88/08 370/278 |
| 8,737,547 | B2 | 5/2014 | Amrutur et al. |
| 8,737,935 | B2 | 5/2014 | Afsahi et al. |
| 8,957,722 | B2 | 2/2015 | Zienkewitz et al. |
| 8,989,105 | B2 | 3/2015 | Wu |
| 8,995,591 | B2 | 3/2015 | Gudem et al. |
| 9,048,284 | B2 | 6/2015 | McPartlin et al. |
| 9,065,523 | B2 | 6/2015 | Campos et al. |
| 9,083,518 | B2 | 7/2015 | Bauder et al. |
| 9,300,420 | B2 | 3/2016 | Chang et al. |
| 9,325,042 | B2 | 4/2016 | Taniuchi et al. |
| 2005/0036563 | A1 | 2/2005 | Suzuki et al. |
| 2009/0233568 | A1 | 9/2009 | Zhang et al. |
| 2009/0289744 | A1 | 11/2009 | Miyashiro |
| 2010/0003943 | A1 | 1/2010 | Seendripu et al. |
| 2012/0140743 | A1 | 6/2012 | Pelletier et al. |
| 2012/0300887 | A1 | 11/2012 | Seendripu et al. |
| 2013/0309979 | A1 | 11/2013 | Wu |
| 2015/0109977 | A1 | 4/2015 | Loh |
| 2015/0117280 | A1 | 4/2015 | Khlat et al. |
| 2015/0163044 | A1 | 6/2015 | Analui et al. |
| 2017/0317711 | A1 | 11/2017 | Jian et al. |

OTHER PUBLICATIONS

"AD8330—Low Cost, DC to 150 MHz Variable Gain Amplifier," Datasheet, Analog Devices, rev. D., May 2016, pp. 1-32.
"Addressing Carrier Aggregation Challenges Using Multiplexer Solutions," White Paper, Qorvo, Jan. 2016, pp. 1-6.
"MCP4728—12-Bit, Quad Digital-to-Analog Converter with EEPROM Memory," Datasheet, Microchip, 2010, pp. 1-69.
"MGA-16516—Low Noise, High Linearity Match Pair Low Noise Amplifier," Datasheet, Avago Technologies, 2010, pp. 1-16.
"X3C17A1-03WS 90 Hybrid Coupler," Datasheet, Anaren Inc., 2013, rev. B., pp. 1-19.
3GPP, "Evolved Universal Terrestrial Radio Access (E-UTRA); Base Station (BS) Radio Transmission and Reception," 3rd Generation Partnership Project (3GPP), TS 36.104, Mar. 2016, pp. 1-207.
A. Technologies, "Noise Figure Measurement Accuracy—The Y-Factor Method," Agilent Technologies, Application Note 57-2, Feb. 2014, pp. 1-46.
Avago Tech, "App Notes 5441: LNA Design with the MGA-16516 Matched Pair, Low Noise Amplifier", Technical Paper, Aug. 13, 2010, pp. 1-16.
B. van Liempd et al., "A 0.9 V 0.4-6 GHz Harmonic Recombination SDR Receiver in 28 nm CMOS With HR3/HR5 and IIP2 Calibration," IEEE J. Solid-State Circuits, vol. 49, No. 8, pp. 1815-1826, Aug. 2014.
Belostotski et al., "Sub-0.2 dB Noise Figure Wideband Room-Temperature CMOS LNA With Non-50 Signal-Source Impedance," in IEEE Journal of Solid-State Circuits, vol. 42, No. 11, Nov. 2007, pp. 2492-2502.
Blaakmeer et al., "Wideband Balun-LNA With Simultaneous Output Balancing, Noise-Canceling and Distortion-Canceling", In IEEE Journal of Solid-State Circuits, vol. 43, No. 6, Jun. 2008, pp. 1341-1350.
Borremans et al., "A 40 nmCMOS 0.4-6 GHz Receiver Resilient to Out-of-Band Blockers," In IEEE Journal of Solid-State Circuits, vol. 46, No. 7, Jul. 2011, pp. 1659-1671.
Bruccoleri et al., "Wide-Band CMOS Low-Noise Amplifier Exploiting Thermal Noise Canceling", in IEEE Journal of Solid-State Circuits, vol. 39, No. 2, Feb. 2004, pp. 275-282.
C. Cox, An Introduction to LTE: LTE, LTE-Advanced, SAE, VoLTE and 4G Mobile Communications, 2nd Edition, Wiley, 2014, pp. 1-487.
Chen et al., "Dual-Carrier Aggregation Receiver with Reconfigurable Front-End RF Signal Conditioning", In IEEE Journal of Solid-State Circuits, vol. 50, No. 8, Apr. 20, 2015, pp. 1874-1888.
Chen et al., "Reconfigurable Receiver with Radio-Frequency Current-Mode Complex Signal Processing Supporting Carrier Aggregation", In IEEE Journal of Solid-State Circuits, vol. 50, No. 12, Aug. 17, 2015, pp. 3032-3046.
Chen et al., "Reconfigurable SDR Recevier with Enhanced Front-End Frequency Selectivitiy Suitable for Intra-Band and Inter-Band Carrier Aggregation", In IEEE 2015 International Solid-State Circuits Conference Digest of Technical Papers, Feb. 25, 2015, pp. 1-3.
Conta et al., "A 0.9dB NF 9mW 28nm Triple-Band GNSS Radio Receiver," in IEEE Radio Frequency Integrated Circuits Symposium, Jun. 2014, pp. 213-216.
D. M. Pozar, Microwave Engineering (4th Edition). Wiley, 2011, pp. 1-756.
Fabiano et al., "Saw-less Analog Front-End Receivers for TDD and FDD", IEEE Journal of Solid-State Circuits, vol. 48, No. 12, Dec. 2013, pp. 3067-3079.
Girard, P.A. and Solal, M., "High Performance Single-Balanced Duplexer", In IEEE International Microwave Symposium, Jun. 2007, pp. 861-864.
Glynn et al., "A 28GHz, 4-channel Phase Adjustable Power Amplifier IC for 5G front-ends", Plextek RFI White Paper, Mar. 2015, pp. 1-5.
He et al., "A Compact SAW-less Multiband WCDMA/GPS Receiver Front-End with Translational Loop for Input Matching," in Digest of Technical Papers IEEE International Solid-State Circuits Conference, Feb. 23, 2011, pp. 372-374.
Hong et al., "Applications of self-interference cancellation in 5G and beyond", IEEE communications Magazine, vol. 52, Issue 2, Feb. 2014, pp. 114-121.
Hwu et al., "A Receiver Architecture for Intra-Band Carrier Aggregation", In VLSI Circuits Digest of Technical Papers, 2014 Symposium, Jun. 10, 2014, pp. 1-2.
Hwu et al., "An RF Receiver for Intra-Band Carrier Aggregation", In IEEE Journal of Solid-State Circuits, vol. 50, No. 4, Apr. 2015, pp. 946-961.
International Preliminary Report on Patentability dated Apr. 10, 2018 in International Patent Application No. PCT/US2016/055374, pp. 1-16.
International Preliminary Report on Patentability dated Nov. 29, 2018 in International Patent Application No. PCT/US2017/033857, pp. 1-9.
International Search Report and Written Opinion dated Aug. 10, 2017 in International Patent Application No. PCT/US2017/033857, pp. 1-14.

(56) References Cited

OTHER PUBLICATIONS

International Search Report and Written Opinion dated Dec. 28, 2016 in International Patent Application No. PCT/US2016/055,374, pp. 1-24.
Izquierdo et al., "Reconfigurable Wide-Band Receiver with Positive Feed-Back Translational Loop", in IEEE Radio Frequency Integrated Circuits Symposium, Jun. 2011, pp. 1-4.
J. Zhu and P. R. Kinget, "A Very-Low-Noise Frequency-Translational Quadrature-Hybrid Receiver for Carrier Aggregation," in IEEE Intern. Solid-State Circuits Conference, Feb. 2016, pp. 168-169.
Jeon et al., "A Scalable 6-to-18 GHz Concurrent Dual-Band Quad-Beam Phased-Array Receiver in CMOS," IEEE Journal of Solid-State Circuits, vol. 43, No. 12, Dec. 2008, pp. 2660-2673.
Ji, D. et al., "A Novel Load Mismatch Detection and Correction Technique for 3g/4g Load in-Sensitive Power Amplifier Application", In IEEE Transactions on Microwave Theory and Techniques, vol. 63, No. 5, May 2015, pp. 1530-1543.
Kerr, A., "On the Noise Properties of Balanced Amplifiers", In IEEE Microwave and Guided Wave Letters, vol. 8, No. 11, Nov. 1998, pp. 390-392.
Kim et al., "A Wideband Front-End Receiver Implementation on GPUs", in IEEE Transactions on Signal Processing, vol. 64, issue 10, May 15, 2016, pp. 2602-2612.
Kim et al., "An FBAR—and LTCC-based RF front-end module for Wi-Fi and WiMAX dual-mode systems", Microwave and Optical Technology Letters, vol. 52, Issue 3, Mar. 2010, pp. 753-757.
Kitayabu et al., "Concurrent Dual-Band Transmitter Architecture for Spectrum Aggregation System", In IEEE Radio and Wireless Symposium, Sep. 26, 2010, pp. 689-692.
Klemmer et al., "A 45nm CMOS RF-to-Bits LTE/WCDMA FDD/TDD 2x2 MIMO Base-Station Transceiver SoC with 200MHz RF Bandwidth," in Digest of Technical Papers IEEE International Solid-State Circuits, Jan. 2016, pp. 164-165.
Klumperink et al., "Achieving Wideband Sub-1dB Noise Figure and High Gain with MOSFETs if Input Power Matchingis not Required", in IEEE Radio Frequency Integrated Circuits Symposium, Jun. 2007, pp. 673-676.
Klumperink et al., "ES3: How to Achieve 1000x More Wireless Data Capacity? 5G?" in Digest of Technical Papers IEEE International Solid-State Circuits Conference, Feb. 2015, pp. 1-1.
Kurokawa, K., "Design Theory of Balanced Transistor Amplifiers", The Bell System Technical Journal, vol. 44, No. 8, Oct. 1965, pp. 1675-1698.
Murphy et al., "A Blocker-Tolerant Wideband Noise-Cancelling Receiver with a 2dB Noise Figure," In IEEE 2012 International Solid-State Circuits Conference Digest of Technical Papers, Feb. 20, 2012, pp. 1-3.
Murphy et al., "A Blocker-Tolerant, Noise-Cancelling Receiver Suitable for Wideband Wireless Applications," IEEE Journal of Solid-State Circuits, vol. 47, No. 12, Dec. 2012, pp. 2943-2963.
Nauta, B., "A CMOS Transconductance-C Filter Technique for Very High Frequencies", in IEEE Journal of Solid-State Circuits, vol. 27, No. 2, Feb. 1992, pp. 142-153.
Notice of Allowance dated Apr. 29, 2020 in U.S. Appl. No. 15/765,795, pp. 1-39.
Office Action dated Dec. 30, 2019 in U.S. Appl. No. 15/765,795, pp. 3-32.
Oliveria et al., "A 5?GHz quadrature relaxation oscillator with mixing for improved testability or compact front-end implementation", International Journal of Circuit Theory and Applications, vol. 38, Issue 5, May 2010, pp. 359-366.
PR Newswire, "Microsemi Introduces World's First SiGe-based, Monolithic RF Front End Device Designed for Broadcom's 5G WiFi Mobile Platforms", Microsemi News Release, Nov. 2012, pp. 1-3.
Rabbeni, P. et al., "RF SOI: Revolutionizing RF System Design", In Microwave Journal, Oct. 2015, pp. 1-8.
Ramadan et al., "A reconfigurable RF front-end receiver for autonomous spectrum sensing cognitive radios" 2016, 10th European Conference on Antennas and Propagation Proceedings, Apr. 2016, pp. 1-20.
Razavi, B., "RF Microelectronics", 2nd Edition, Prentice Hall, 2011, pp. 1-941.
Roh et al., "Millimeter-wave beamforming as an enabling technology for 5G cellular communications: theoretical feasibility and prototype results", IEEE Communications Magazine, vol. 52, Issue 2, Feb. 2014, pp. 106-113.
SAW Filter 856530 Datasheet, TriQuint, Aug. 2006, pp. 1-6.
Sundstrom, L. et al., "Receiver for LTE Rel-11 and Beyond Supporting Non-Contiguous Carrier Aggregation", In IEEE International Solid-State Circuits Conference Digest of Technical Papers (ISSCC), Feb. 17, 2013, pp. 336-337.
T. Lee, The Design of CMOS Radio-Frequency Integrated Circuits. Cambridge University Press, 2004, pp. 1-404.
T. Takai, H. Iwamoto, Y. Takamine, T. Wada, M. Hiramoto, M. Koshino, and N. Nakajima, "Investigations on Design Technologies for Saw Quadplexer with Narrow Duplex Gap," in Intern. Microwave Symposium, May 2016, pp. 1-4.
Tatomirescu et al., "Multi-Band Compact Antenna for Smartphones Supporting LTE Carrier Aggregation", In IEEE Vehicular Technology Conferenc, May 11-14, 2015, pp. 1-5.
W. Mueller and R. Ruby, "Multiplexers as a Method of Supporting Same-Frequency-Range Down Link Carrier Aggregation," in Intern. Microwave Symposium, May 2016, pp. 1-4.
Walden et al., "Analog-to-Digital Converter Survey and Analysis", in IEEE Journal on Selected Areas in Communications, vol. 17, No. 4, Apr. 1999, pp. 539-550.
Yao et al., "1.5-2.7 GHz Ultra Low Noise Bypass LNA," in IEEE MTTS-S International Microwave Symposium, Jun. 2014, pp. 1-3.
Yi et al., "A 65nm CMOS carrier-aggregation transceiver for IEEE 802.11 WLAN applications", in IEEE Radio Frequency Integrated Circuits Symposium, May 22-24, 2016, pp. 67-70.
Zhang et al., "Linearization Techniques for CMOS Low Noise Amplifiers: A Tutorial", in IEEE Transactions on Circuits and Systems I, vol. 58, No. 1, Jan. 2011, pp. 22-36.
Zhou et al., "Using Capacitive Cross-Coupling Technique in RF Low NoiseAmplifiers and Down-Conversion Mixer Design", in Proceedings European Solid-State Circuits Conference, Sep. 2000, pp. 1-5.
Zhu et al., "A Field-Programmable Noise-Canceling Wideband Receiver with High-Linearity Hybrid Class-AB-C LNTAs," in Proceedings of the IEEE Custom Integrated Circuits Conference, Sep. 2015, pp. 1-4.
Zhu, J. et al., "A Very-Low-Noise Frequency-Translational Quadrature-Hybrid Receiver for Carrier Aggregation", in Digest of Technical Papers IEEE International Solid-State Circuits Conference, Feb. 2016, pp. 168-169.

* cited by examiner

CIRCUITS FOR WIRELESS COMMUNICATION ON MULTIPLE FREQUENCY BANDS

CROSS-REFERENCE TO RELATED APPLICATION

This application claims the benefit of U.S. Provisional Patent Application No. 62/339,693, filed May 20, 2016, and U.S. Provisional Patent Application No. 62/385,193, filed Sep. 8, 2016, each which is hereby incorporated by reference herein in its entirety.

STATEMENT REGARDING GOVERNMENT FUNDED RESEARCH

This invention was made with government support under Grant #: HR0011-12-1-0006 awarded by the Department of Defense, Defense Advanced Research Projects Agency. The government has certain rights in the invention.

BACKGROUND

To meet the demands of ever-increasing data throughput, carrier aggregation (CA) between different frequency bands is becoming necessary. Differing spectrum allocations around the globe lead to a very large number of band combinations and put demanding performance requirements on the antenna interfaces for wideband receivers for interband CA. Sometimes multiple antennas are used, e.g. one for each band, but the small factor of mobile terminals severely limits the number of antennas. Splitting the antenna signal with filter banks and switches becomes very complex and costly due to the large number of band combinations (>90 currently).

Accordingly, new circuits for wireless communication capable of handling multiple frequencies are desirable.

SUMMARY

Circuits for wireless communication on multiple frequency bands are provided. In accordance with some embodiments, transceivers are provided, the transceivers comprising: a first quadrature hybrid having a first in port, a first iso port, a first cpl port, and a first thru port; an antenna coupled to the first in port; a first transmitter having an output coupled to the first cpl port; and a first receiver having an input coupled to the first cpl port.

DETAILED DESCRIPTION

Figure 1:
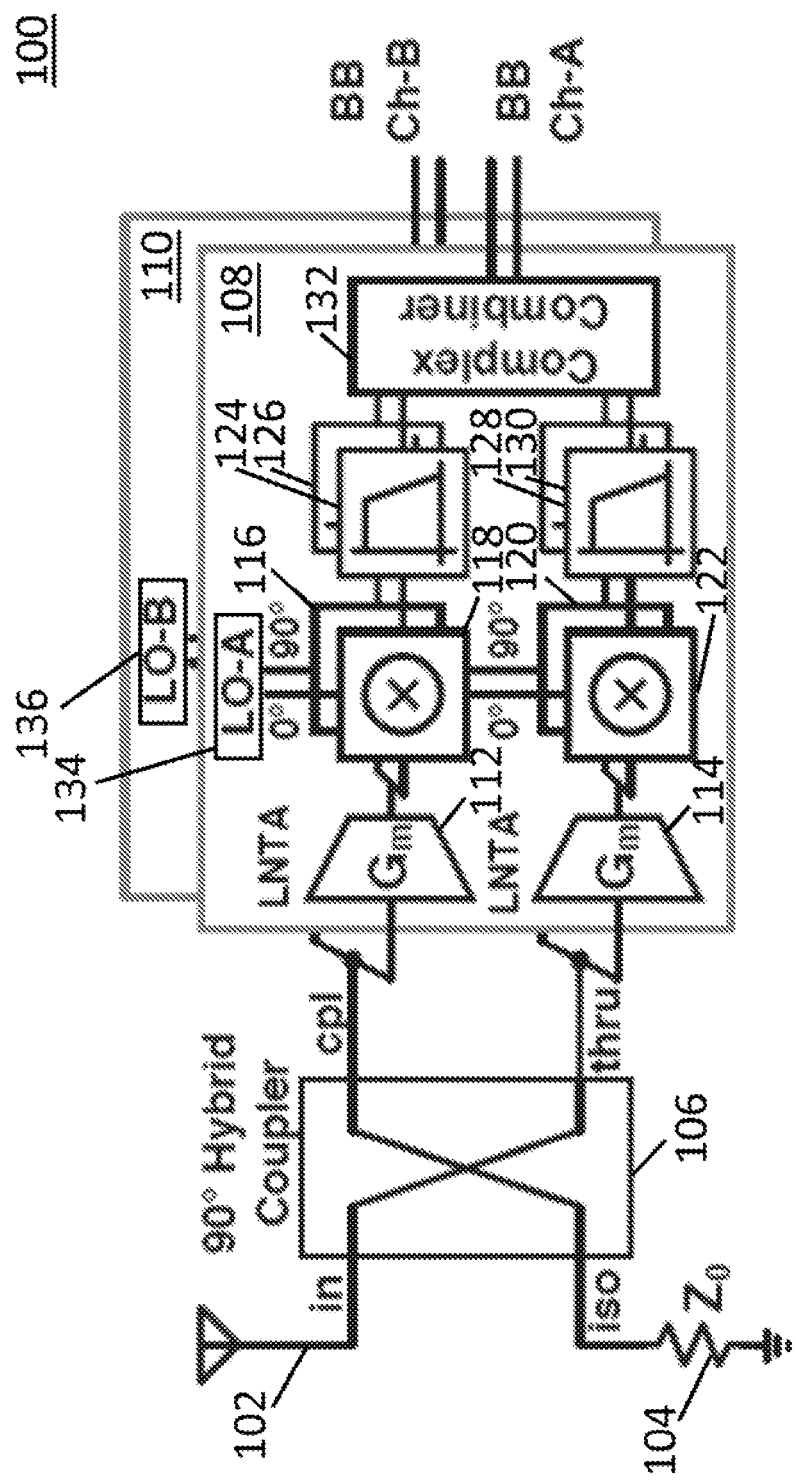
FIG. 1 is an example of a schematic of a receiver using one 90-degree hybrid coupler in accordance with some embodiments.

Turning to FIG. 1, an example 100 of a receiver in accordance with some embodiments is shown. As illustrated, receiver 100 includes an antenna 102, a termination resistor 104, a 90-degree hybrid coupler (which may also be referred to herein as a "quadrature hybrid") 106, channel A circuitry 108, and channel B circuitry 110. As shown, channel A circuitry 108 and channel B circuitry 110 can include low noise transconductance amplifiers (LNTAs) 112 and 114, mixers 116, 118, 120, and 122, filters 124, 126, 128, and 130, and a complex Cartesian combiner 132. LNTA 112, mixers 116 and 118, and filters 124 and 126 form a first quadrature downconverter. LNTA 114, mixers 120 and 122, and filters 128 and 130 form a second quadrature downconverter.

As also shown, the mixers receive 0 degree and 90 degree local oscillators A 134 and 0 degree and 90 degree local oscillators B 136. In channel A circuitry 108, mixers 118 and 122 are driven by the 0-degree local oscillator A signal and mixers 116 and 120 are driven by the 90-degree local oscillator A signal. In channel B circuitry 110, mixers 118 and 122 are driven by the 0-degree local oscillator B signal and mixers 116 and 120 are driven by the 90-degree local oscillator B signal.

Figure 2:
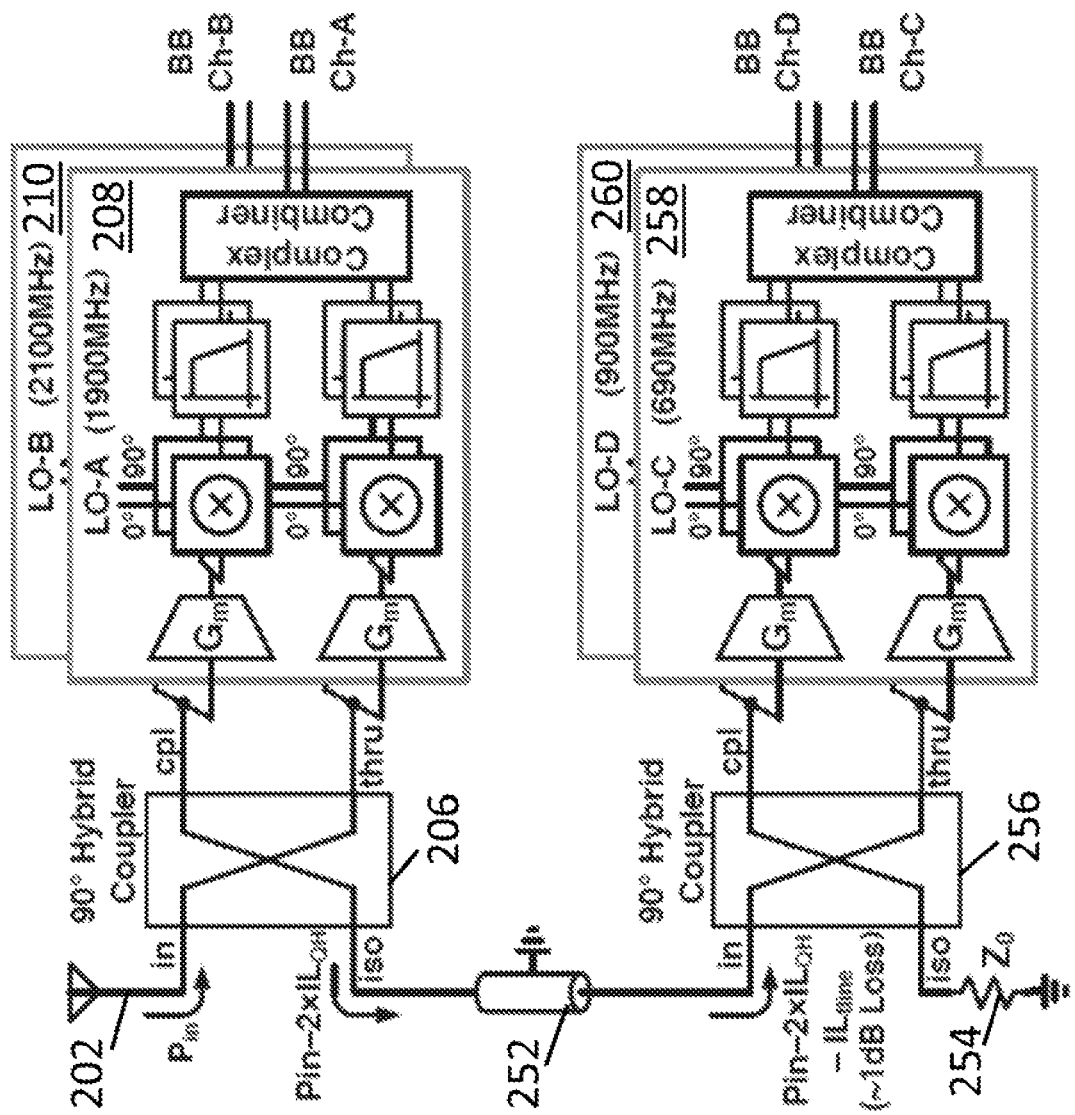
FIG. 2 is an example of a schematic of a receiver using two 90-degree hybrid couplers in accordance with some embodiments.

FIG. 2 shows another example 200 of a receiver in accordance with some embodiments. As illustrated, receiver 200 includes an antenna 202, quadrature hybrids 206 and 256, a connection 252, a termination resistor 254, channel A circuitry 208, channel B circuitry 210, channel C circuitry 258, and channel D circuitry 260.

Channel A circuitry 208, channel B circuitry 210, channel C circuitry 258, and channel D circuitry 260 can each include the components described above as being included in channel A circuitry 108 of FIG. 1.

Antennas 102 and 202 can be any suitable antennas, in some embodiments. For example, in some embodiments, antennas 102 and 202 can be antennas suitable to receive any suitable one or more frequencies, or one or more ranges of frequencies, of signals.

Although antennas 102 and 202 are shown in FIGS. 1 and 2 as inputs to the 90 degree hybrid couplers 106 and 206, this does not imply that couplers 106 and 206 can only receive signals from an antenna. The antenna symbol is used to denote an RF signal source but that source need not be an actual antenna. This symbol convention applies to all the figures in this document.

Termination resistors 104 and 254 can be any suitable resistors and have any suitable values (e.g., 50 ohms), in some embodiments.

Quadrature hybrids 106, 206, and 256 can be any suitable quadrature hybrids, in some embodiments. For example, in some embodiments, each can be implemented using a model X3C17A1-03WS surface mount quadrature hybrid available from ANAREN, INC. of East Syracuse, N.Y., USA. As another example, the quadrature hybrids can be implemented as described below in connection with FIGS. 38-43.

Connection 252 can be any suitable connection between the quadrature hybrids, in some embodiments. For example, in some embodiments, the connection can be a wire connection, a printed circuit board trace, a transmission line, etc.

LNTAs 112 and 114 can be any suitable LNTAs or low-noise amplifiers (LNAs), in some embodiments. For example, in some embodiments, the LNTAs can be formed from transconductors, can be formed from discrete components (such as gallium arsenide (GaAs) transistors), can be common source LNTAs, etc. In some embodiments, each LNTA can be formed from any suitable number of parallel common source transconductors. In some embodiments, the number of such parallel common source transconductors can be increased based on characteristics of the receiver. Increasing the number of parallel common source transconductors can be used to scale up the transconductance and trade off noise factor reduction for increased power dissipation.

Mixers 116, 118, 120, and 122 can be any suitable mixers, in some embodiments. For example, in some embodiments, the mixers can be current-driven passive mixers. In some embodiments, the mixers can be active mixers or passive mixers.

Filters 124, 126, 128, and 130 can be any suitable filters, in some embodiments. For example, in some embodiments, the filters can be active or passive low pass filters of various orders and with appropriate in-band gain.

Figure 20:
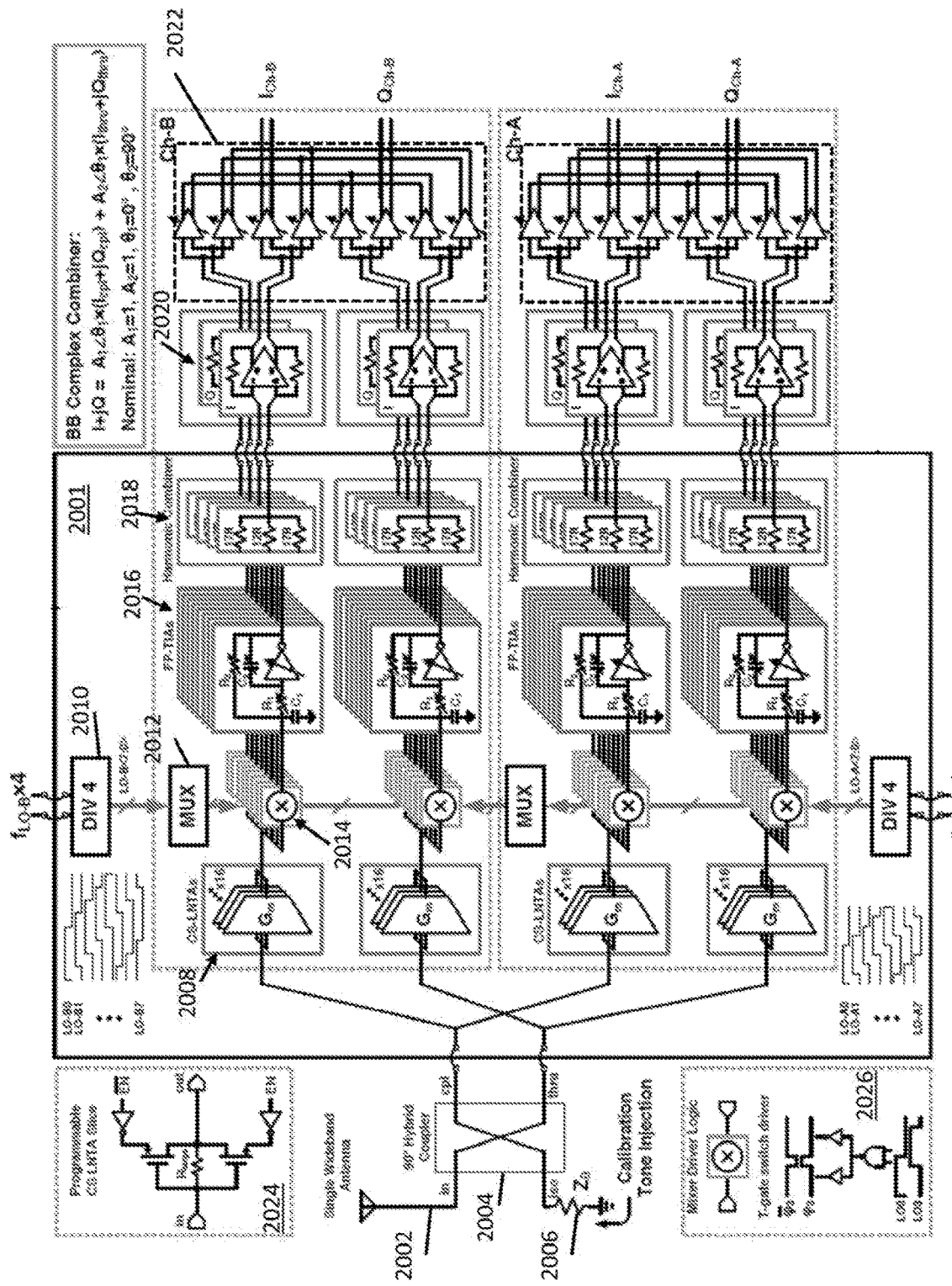
FIG. 20 is an example of a schematic of an integrated circuit in accordance with some embodiments.

Complex Cartesian combiner 132 can be any suitable complex combiner, in some embodiments. For example, in some embodiments, the complex combiner can be formed from variable-gain transconductance amplifiers with coupled outputs as illustrated in FIG. 20. In some embodiments variable-gain voltage amplifiers with output voltage summing can be used.

While examples of current mode devices and voltage mode devices are provided in different places herein, it should be apparent to one of ordinary skill that in some embodiments voltage mode devices can be switched with current mode devices, and vice versa, without departing from the spirit and scope of the invention. For example, in some embodiments, quadrature downconverters are described herein as using LNTAs, which provide a current mode output. It should be apparent that the LNTAs can be replaced with low noise amplifiers (LNAs), which provide a voltage mode output, in some embodiments. When such substitutions are made, other circuits, such as adjacent mixers may be changed accordingly.

Figure 3:
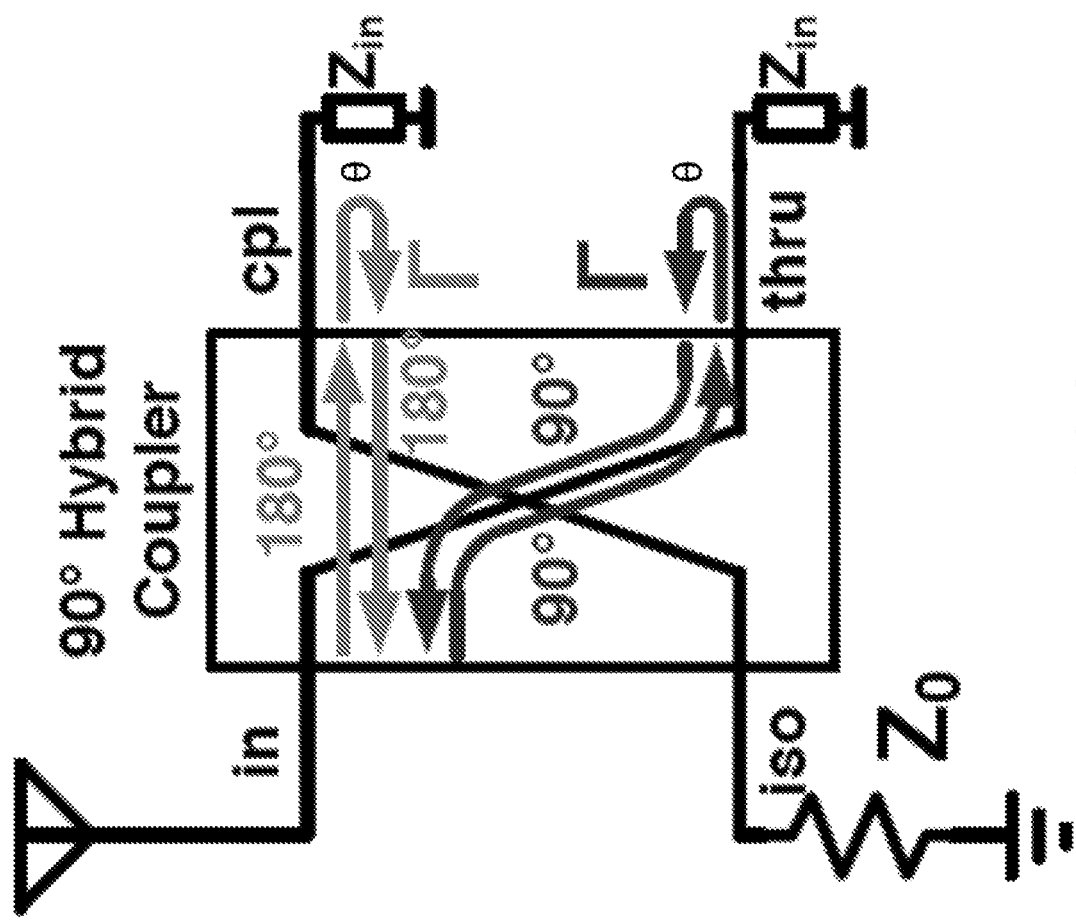
FIG. 3 is an example of reflectance in a 90-degree hybrid coupler in accordance with some embodiments.
Figure 4:
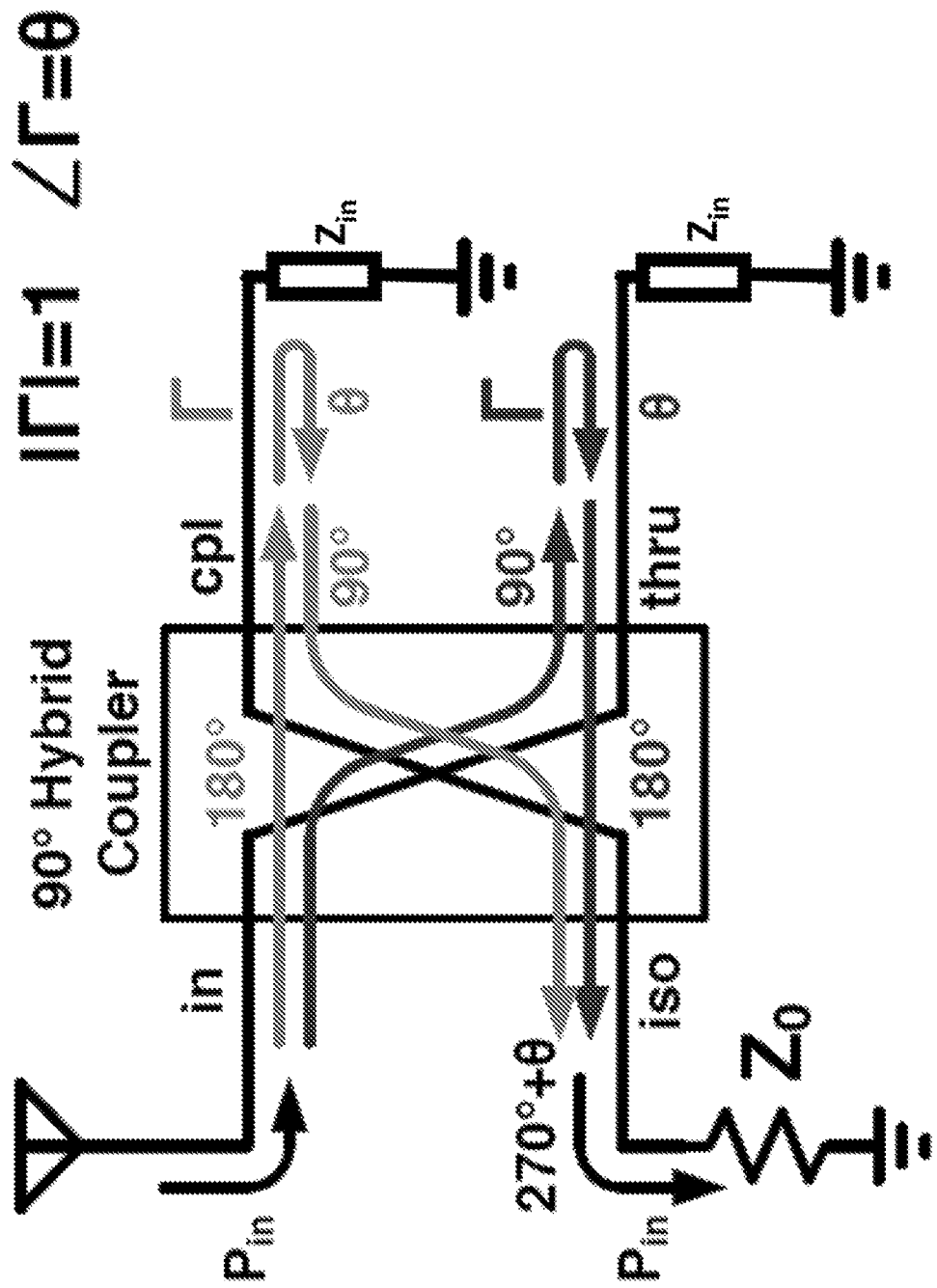
FIG. 4 is another example of reflectance in a 90-degree hybrid coupler in accordance with some embodiments.

Referring to FIGS. 3 and 4, examples of the operation of a quadrature hybrid in accordance with some embodiments is illustrated. As shown in FIG. 3, the quadrature hybrid is connected at an in port to an antenna (or any other signal source), at an iso port to a termination resistor $Z_0$, and at a cpl port and a thru port to two identical loads both with impedance $Z_{in}$. The associated reflection coefficient is Γ. The iso port is terminated with the system impedance $Z_0$.

As shown in the figure, the power of an incident wave at the in port is split equally to the cpl port and the thru port. The wave is then reflected back by the impedances $Z_{in}$ to the in port based on the reflection coefficient Γ. As illustrated, the wave going from the in port to the cpl port and back to the in port undergoes two 180-degree phase shifts, and a θ degree phase shift, for a total phase shift of 360+θ degrees. The wave going from the in port to the thru port and back to the in port undergoes two 90-degree phase shifts, and a θ degree phase shift, for a total phase shift of 180+θ degrees. Because the phase difference between the two waves reflected back to the in port is 180 degrees, the two waves cancel out at the in port and no reflection is observed by the source. Thus, as long as the iso port is properly terminated and the cpl port and the thru port are loaded by the same impedance Z, the input impedance matching condition is maintained.

Turning to FIG. 4, an example of the impact on the iso port of the quadrature hybrid from a signal at the in port of the quadrature hybrid is illustrated for a reflective impedance $Z_{in}$ (i.e., |Γ|=1). As shown and mentioned above, the power of the incident wave at the in port is split equally to the cpl port and the thru port. The wave is then fully reflected by the impedances $Z_{in}$ to the iso port based on the reflection coefficient Γ. As illustrated, the wave going from the in port to the cpl port to the iso port undergoes 180-degree phase shift, a θ-degree phase shift, and a 90-degree phase shift, for a total phase shift of 270+θ degrees. The wave going from the in port to the thru port to the iso port undergoes a 90-degree phase shift, a θ-degree phase shift, and a 180-degree phase shift, for a total phase shift of 270+θ degrees. Because the two waves reflected to the iso port have the same phase shift, the signal constructively interfere and the signal power delivered to the in port appears at the iso port.

The insertion loss from the in port to the iso port depends on the return loss (RL) associated with $Z_{in}$. Thus, if $Z_{in}$ is a highly reflective load, a theoretically low loss power redirection can be achieved from the in port to the iso port. In the case of a low loss quadrature hybrid, the insertion loss of the quadrature hybrid can be denoted by $IL_{hybrid}$. The total insertion loss from the in port to the iso port is then IL (dB)=2×$IL_{hybrid}$ (dB)+RL (dB). For instance, if $Z_{in}$ is a capacitor, the magnitude of the reflection is close to 1 if the Q of the capacitance of $Z_{in}$ is high so low loss is achieved, and the phase shift can be tuned by tuning the value of the capacitance of $Z_{in}$.

Figure 5:
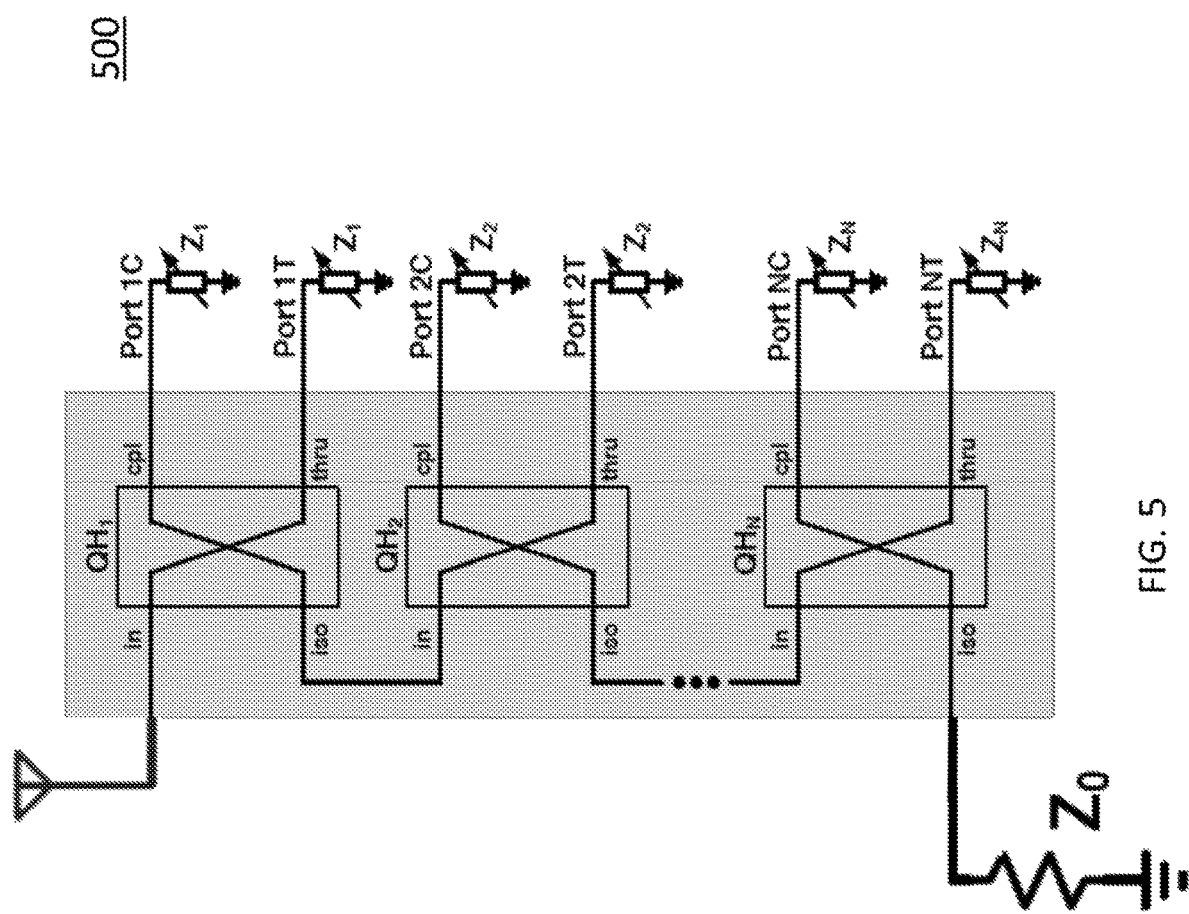
FIG. 5 is an example of cascading of 90-degree hybrid couplers in accordance with some embodiments.

Referring to FIG. 5, an architecture 500 for quadrature hybrids that can be used in some embodiments is illustrated. As shown, N quadrature hybrids $QH_1$, $QH_2$, ..., $QH_N$ can be arranged such that the in port of $QH_1$ is connected to an antenna, the iso port of $QH_N$ is connected to a termination resistor, and the iso ports of quadrature hybrids $QH_1$ though $QH_{N-1}$ are connected to the in ports of $QH_2$ through $QH_N$, respectively. As also shown, for each quadrature hybrid, the cpl port and the thru port are connected to identical impedances. Thus, the cpl port and the thru port of $QH_1$ are each connected to a load with an impedance $Z_1$, the cpl port and the thru port of $QH_2$ are each connected to a load with an impedance $Z_2$, the cpl port and the thru port of $QH_N$ are each connected to a load with an impedance $Z_N$. As described in connection with FIG. 3, to cause that the reflections to the in port of each quadrature hybrid cancel out, the impedances at the cpl port and the thru port of each quadrature hybrid may be selected to be the same in some embodiments. However, in some embodiments, the impedance at the cpl port and the thru port of one quadrature hybrid need not be the same as the impedance at the cpl port and the thru port of any other quadrature hybrid (though they can be in some embodiments).

As described above in FIG. 4, by using reflective impedances for $Z_1$, $Z_2$, ..., $Z_{N-1}$ in FIG. 5, the signals at the cpl port and the thru port of $QH_1$, $QH_2$, ..., $QH_{N-1}$ can be reflected through the iso ports of $QH_1$, $QH_2$, ..., $QH_{N-1}$ to the in ports of $QH_2$, $QH_3$, ..., $QH_N$, respectively.

By combining the architecture of FIG. 5 with the circuit of FIG. 2, it can be seen that receivers with any suitable number of quadrature hybrids and any suitable number of channel circuitries (e.g., quadrature downconverters and complex combiners) can be used in some embodiments.

In some embodiments, the impedances at the cpl port and the thru port will be reflective to certain frequencies and non-reflective to other frequencies. By selecting the impedances appropriately, a cascade of quadrature hybrids can be configured to not forward certain frequency ranges. For example, in FIG. 500, $QH_1$ can have impedances attached to its cpl and thru ports that do not reflect frequencies around a first given frequency (such as 1400 MHz). In this way, the channel circuitries connected to $QH_1$ may be able to observe only the first given frequency, whereas the channel circuitries connected to $QH_2$ may be able to observe all frequencies except the frequencies not forwarded. Likewise, $QH_2$ can have impedances attached to its cpl and thru ports that do not reflect frequencies around a second given frequency (such 800 MHz). Thus, these frequencies as well as the frequencies around the first given frequency will not be forward to $QH_3$. In some embodiments, filters, such as SAW filters, for example, can be used to selectively pass frequencies in this manner.

Figure 22:
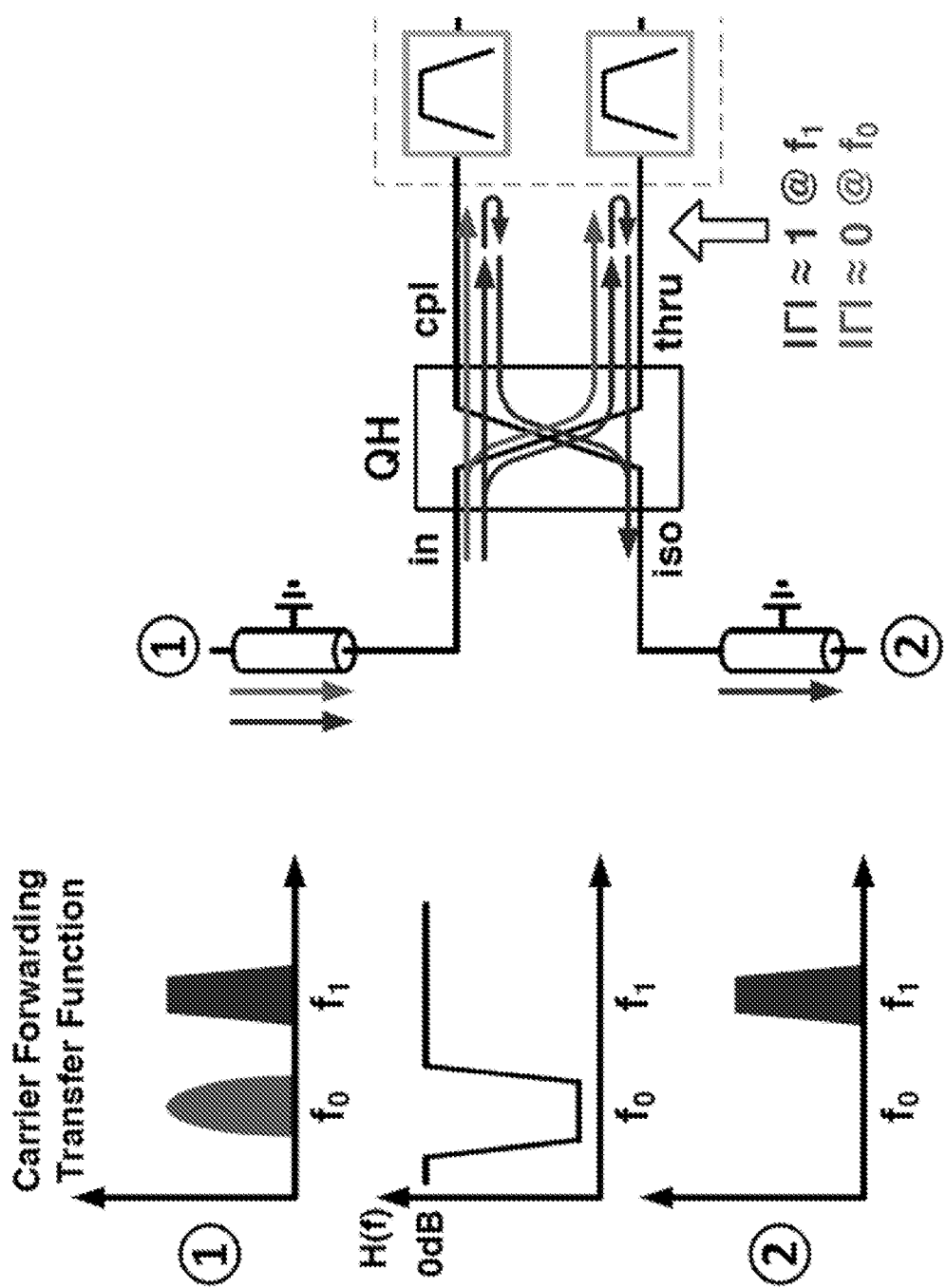
FIG. 22 is an example of selective forwarding signals in accordance with some embodiments.

An illustration of this process is provided in FIG. 22. As shown in this figure, frequencies $f_0$ and $f_1$ are received at the in port of the quadrature hybrid. The impedances connected to the cpl and thru ports do not reflect frequency $f_0$. Hence, this frequency is not forwarded to the iso port. However, the impedances do reflect other frequencies, such as frequency $f_1$. Hence, those other frequencies, including frequency $f_1$, are forward to the iso port and the next quadrature hybrid.

Figure 6:
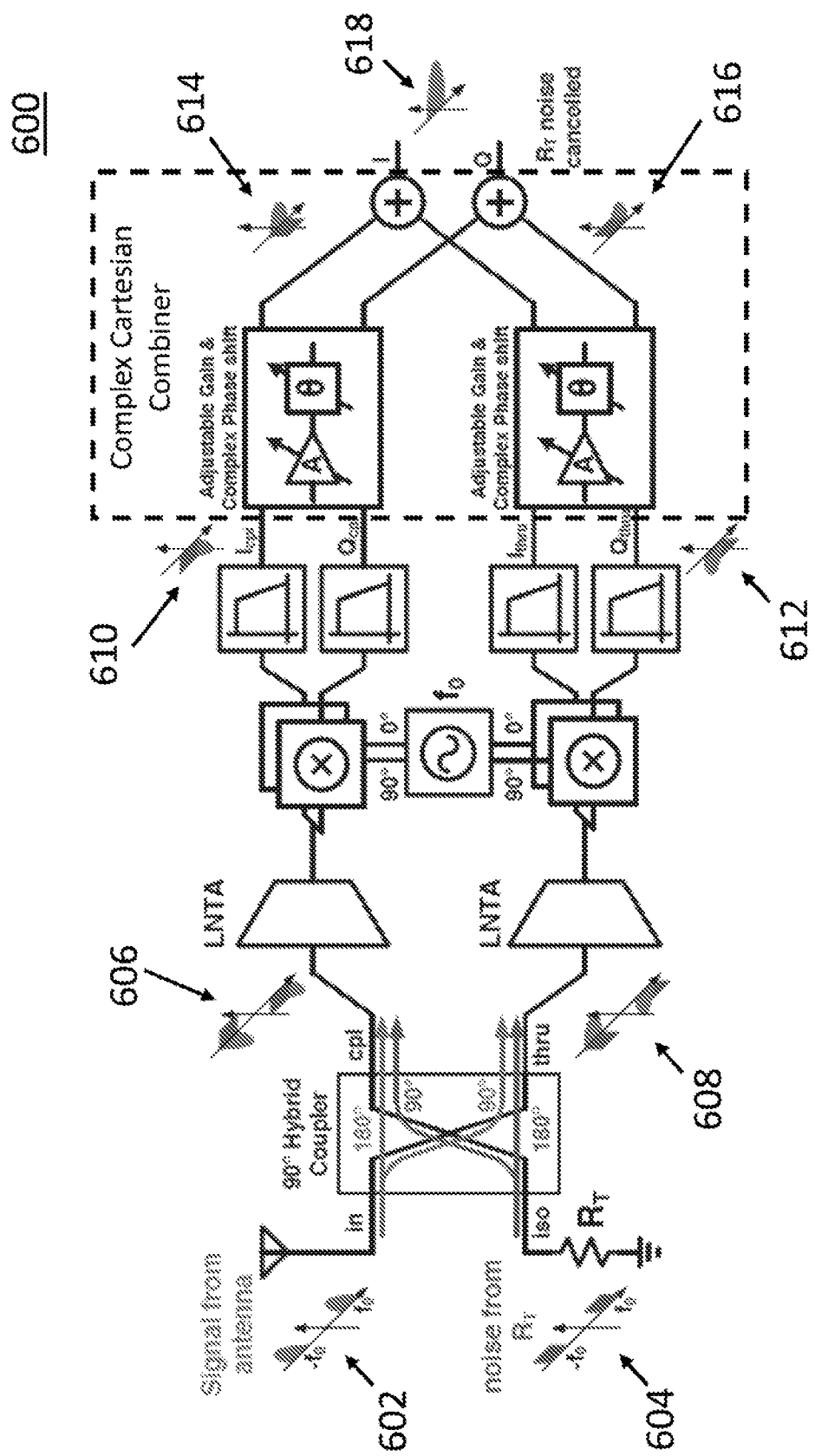
FIG. 6 is an example of noise cancellation in accordance with some embodiments.

FIG. 6 illustrates an example of how noise from a termination resistor can be cancelled in a receiver 600 in accordance with some embodiments. As shown, signal 602 is received at the in port of the quadrature hybrid from the antenna. Noise 604 is received at iso port of the quadrature hybrid from the termination resistor. This noise can be caused by any suitable factor(s). The signal is phase shifted by 180 degrees and presented on the cpl port of the quadrature hybrid, and phase shifted by 90 degrees and presented on the thru port of the quadrature hybrid. The noise is phase shifted by 90 degrees and presented on the cpl port of the quadrature hybrid, and phase shifted by 180 degrees and presented on the thru port of the quadrature hybrid. The combined phase shifted signal and noise at the cpl port and the thru port are represented in the figure by signal/noise 606 and signal/noise 608, respectively.

As shown in FIG. 6, two identical quadrature downconverters (e.g., formed by the illustrated LNTAs, mixers, and filters) are connected to the cpl port and the thru port of the quadrature hybrid. A baseband quadrature phase shift is implemented with the complex Cartesian combiner. Signal/noise 610 and 612 show illustrations of the signal and noise at the inputs to the complex combiner and signal/noise 614 and 616 show illustrations of the signal and noise prior to being combined by the adders in the complex combiner. As shown, at the output of the complex combiner, the noise is cancelled out and the signal is amplified as a result of constructive interference.

In some embodiments, receivers that are capable of simultaneously receiving signals on two or more independent channels using the same antenna are provided.

For example, when using a single quadrature hybrid (e.g., quadrature hybrid 106 as shown in FIG. 1), four quadrature downconverters (e.g., as shown in channel circuitries 108 and 110 of FIG. 1) can be connected to the quadrature hybrid (e.g., as shown in FIG. 1). Each of the channel circuitries can be configured to receive signals on a different channel. In some embodiments, in such a configuration, high-input-impedance low noise transconductance amplifiers (LNTAs) can be used. Thus, the several LNTAs can be put in parallel and split the RF signal in the voltage domain.

As another example, when using multiple quadrature hybrids (e.g., quadrature hybrids 206 and 256 as shown in FIG. 2), eight quadrature downconverters (e.g., as shown in channels circuitries 208, 210, 258, and 260 of FIG. 2) with reflective input impedances (e.g., at the inputs to the LNTA transconductances (Gms)) can cause antenna signal power to be passed from the iso port of a first quadrature hybrid (e.g., 206 as shown in FIG. 2) to the in port of a next quadrature hybrid (e.g., 256 as shown in FIG. 2). If the input impedances of are purely (or nearly purely) reactive impedances (such as a capacitance or an inductance), the magnitude of the load reflection is 1 (or nearly 1) and all (or nearly all) signal power is transferred from the first quadrature hybrid to the next quadrature hybrid. As described in connection with FIG. 5, any suitable number of quadrature hybrids can be cascaded in this way and each quadrature hybrid can be connected to two, four, six, etc. quadrature downconverters.

As shown in FIG. 2, in some embodiments, a four-channel inter-band carrier-aggregating receiver with a single antenna, a two cascaded quadrature hybrids, and four channel circuitries can be used to receive signals in the 690 MHz, 900 MHz, 1900 MHz, and 2100 MHz frequency bands. In some embodiments, because the channel circuitries configured for lower frequencies may result in higher insertion loss in the quadrature hybrids to which the circuitries are connected, the lower frequency channel circuitries may be configured to be on lower quadrature hybrids in a cascade of quadrature hybrids.

In some embodiments, rather than using a termination resistor in the circuits described herein, a second antenna can be used. For example, as shown in example receiver 700 of FIG. 7, antennas 702 and 704 can be connected to the in port and the iso port, respectively, of quadrature hybrid 706. In some embodiments, as long as the two antennas have a good isolation between each other (as is the case for diversity antennas), each antenna should see a matched impedance interface. During operation, the energy absorbed by one antenna may be re-emitted by the other antenna.

In some embodiments, when used as diversity antennas, the diversity antennas can be placed sufficiently far away from each other, or put orthogonally with respect to each other to take advantage of the isolation between different polarizations.

Figure 7:
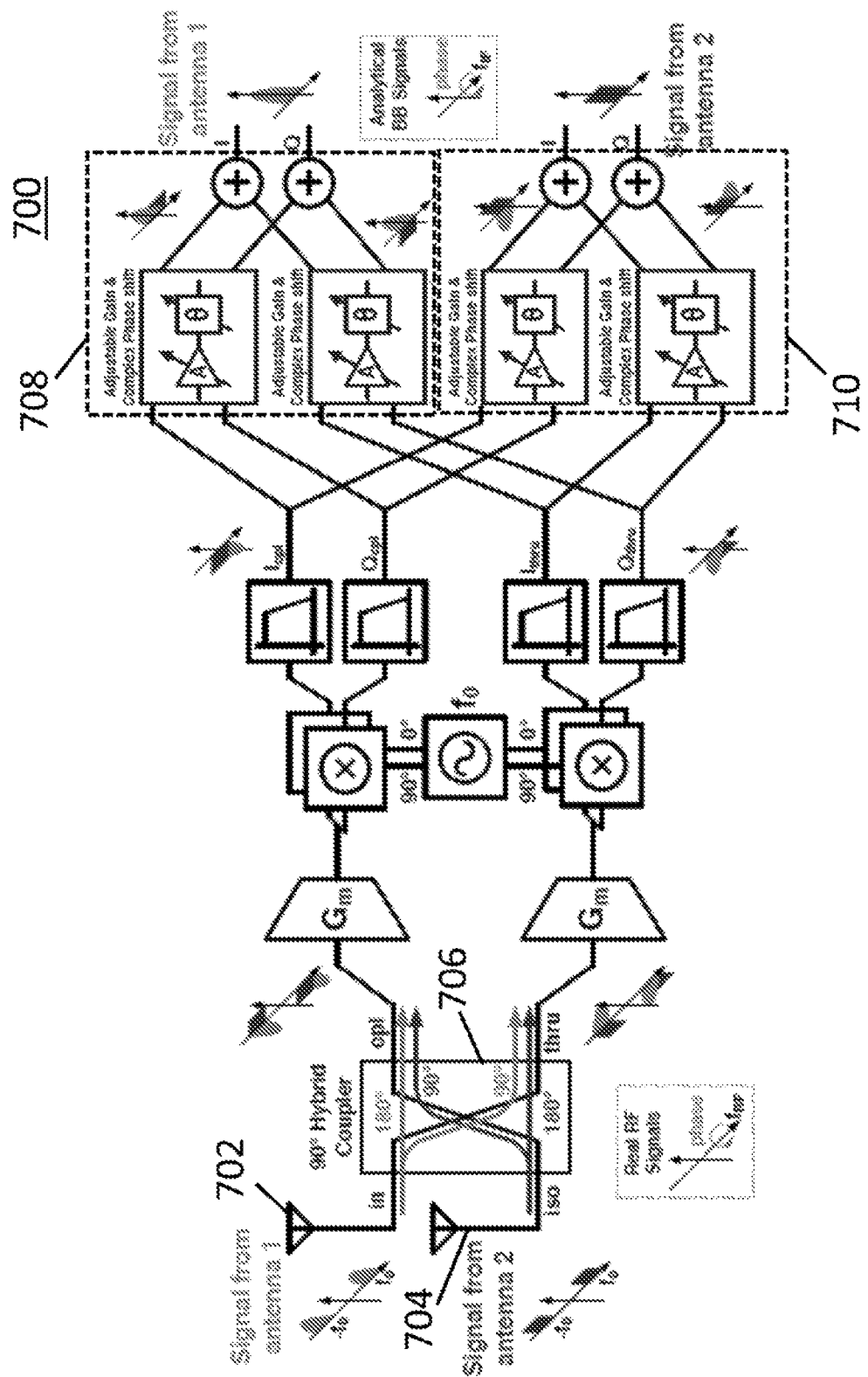
FIG. 7 is an example of using two antennas with a 90-degree hybrid coupler in accordance with some embodiments.

As shown in FIG. 7, one or more of complex combiners 708 and 710 can be used to receive signals originating from one antenna and reject signals originating from the other antenna, in some embodiments. In some embodiments, one or more of the complex combiners can alternatively be configured to provide outputs that are a combination or weighted combination of the two antennas.

In some embodiments, two diversity antennas can be separated in baseband and processed with digital signal processing. The same architecture can also be used for MIMO communications with two antennas where the analog and RF front ends can be used without any change in some embodiments.

Figure 8:
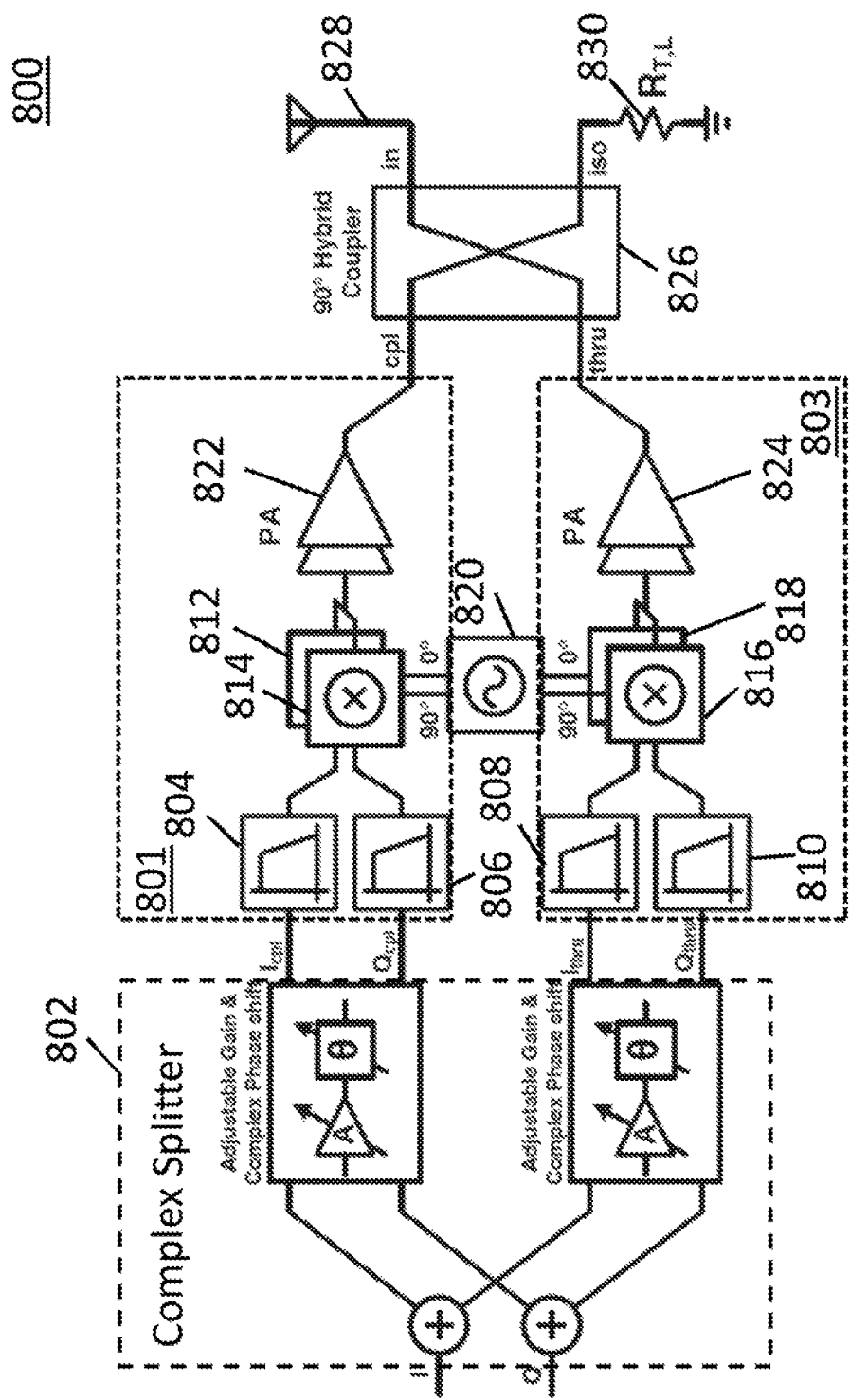
FIG. 8 is an example of a schematic of a transmitter in accordance with some embodiments.

In accordance with some embodiments, a transmitter incorporating a quadrature hybrid can be provided as illustrated in FIG. 8. As shown, a transmitter 800 can include a complex splitter 802, quadrature upconverters 801 and 803, a quadrature local oscillator source 820, a quadrature hybrid 826, an antenna 828, and a termination resistor 830, in some embodiments. In some embodiments, quadrature upconverter 801 can include filters 804 and 806, mixers 812 and 814, and a power amplifier 822. In some embodiments, quadrature upconverter 803 can include filters 808 and 810, mixers 816 and 818, and a power amplifier 824.

Figure 9:
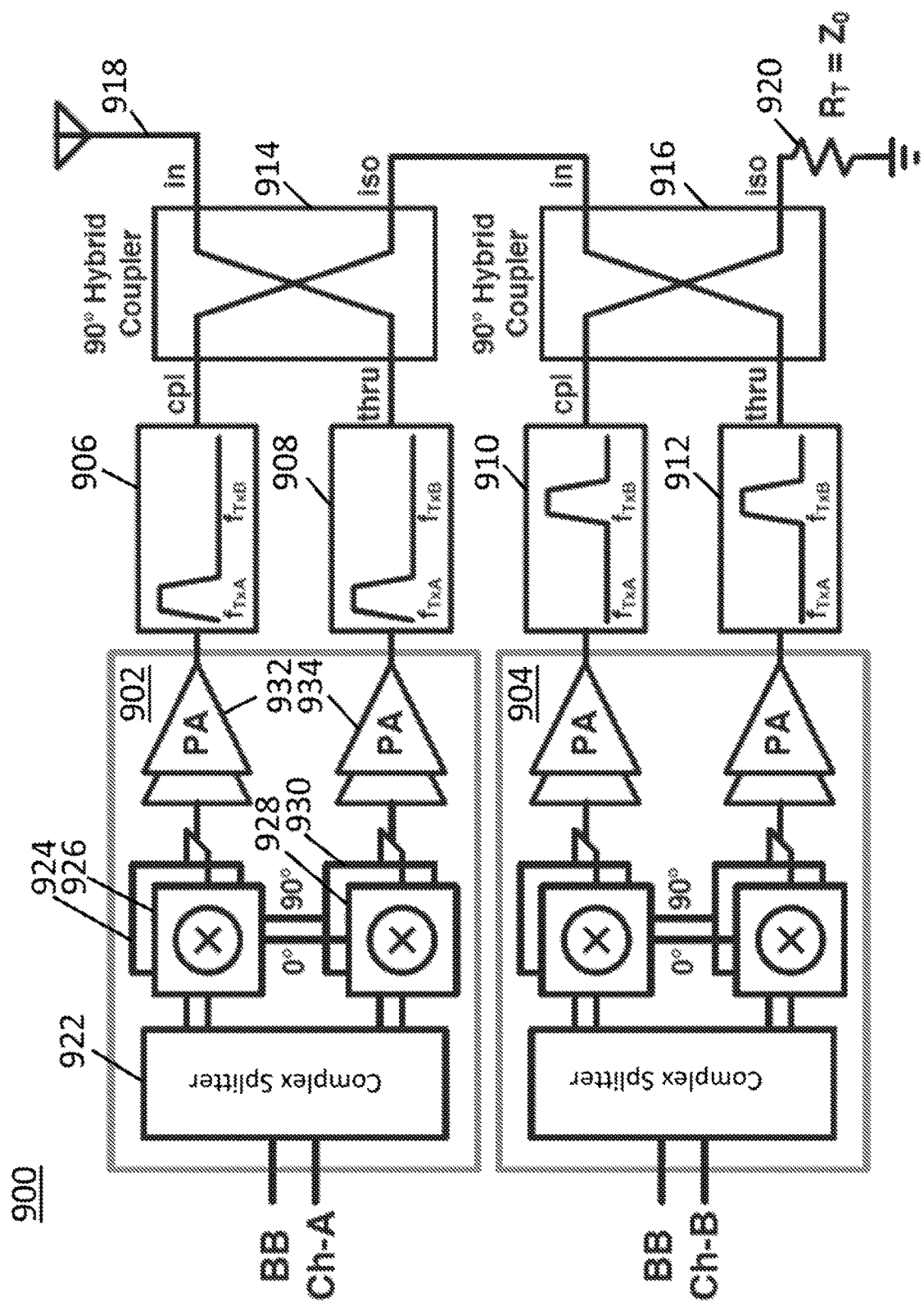
FIG. 9 is an example of a schematic of another transmitter in accordance with some embodiments.

FIG. 9 shows an example 900 of a transmitter using multiple (e.g., two as illustrated) quadrature hybrids in accordance with some embodiments. As shown, transmitter 900 includes channel circuitries 902 and 904, filters 906, 908, 910, and 912, quadrature hybrids 914 and 916, an antenna 918, and a termination resistor 920. In some embodiments, channel circuitries 902 and 904 can each include a complex splitter 922, mixers 924, 926, 928, and 930, and power amplifiers 932 and 934.

Complex Cartesian splitters 801 and 922 can be any suitable complex splitters, in some embodiments. For example, in some embodiments, the complex splitters can be formed from variable-gain transconductance amplifiers with coupled outputs. In some embodiments variable-gain voltage amplifiers with output voltage summing can be used Filters 804, 806, 808, and 810 can be any suitable filters, in some embodiments. For example, in some embodiments, the filters can be active or passive low pass filters of various orders and with appropriate in-band gain. The filters can be active or passive low pass filters of various orders and with appropriate in-band gain.

Filters 906, 908, 910, and 912 can be any suitable filters, in some embodiments. For example, in some embodiments, the filters can be SAW, BAW, or FBAR filters, cavity filters, ceramic filters, etc.

Mixers 812, 814, 816, 818, 924, 926, 928, and 930 can be any suitable upconversion mixers, in some embodiments. For example, in some embodiments, the mixers can be active or passive mixers.

Quadrature hybrids 826, 914, and 916 can be any suitable quadrature hybrids, in some embodiments. For example, in some embodiments, each can be implemented using a model X3C17A1-03WS surface mount quadrature hybrid available from ANAREN, INC. of East Syracuse, N.Y., USA. As another example, the quadrature hybrids can be implemented as described below in connection with FIGS. 38-43.

Antennas 828 and 918 can be any suitable antennas, in some embodiments. For example, in some embodiments, antennas 828 and 918 can be any antennas suitable to receive any suitable one or more frequencies, or one or more ranges of frequencies, of signals.

Termination resistors 830 and 920 can be any suitable resistors and have any suitable values (e.g., 50 ohms), in some embodiments.

In transmitter 900, filters 906 and 908 can provide reflective output impedances at the out-of-band frequencies so that any out-of-band-frequency signals received from the in port of quadrature hybrid 916 at the iso port of quadrature hybrid 914 can be reflected to the in port of quadrature hybrid 914, and hence to antenna 918. In some embodiments, the out-of-band frequencies at which filters 906 and 908 are reflective may be limited to the frequencies of channel B. Likewise, filters 910 and 912 can provide reflective output impedances out-of-band frequencies so that any out-of-band-frequency signals received from the iso port of quadrature hybrid 914 at the in port of quadrature hybrid 916 can be reflected to the iso port of quadrature hybrid 916. In some embodiments, the out-of-band frequencies at which filters 910 and 912 are reflective may be limited to the frequencies of channel A. In some embodiments, filters 906, 908, 910, and 912 can be high quality SAW filters of different frequencies. SAW filters usually present reflective impedance at out-of-band frequencies.

Figure 10:
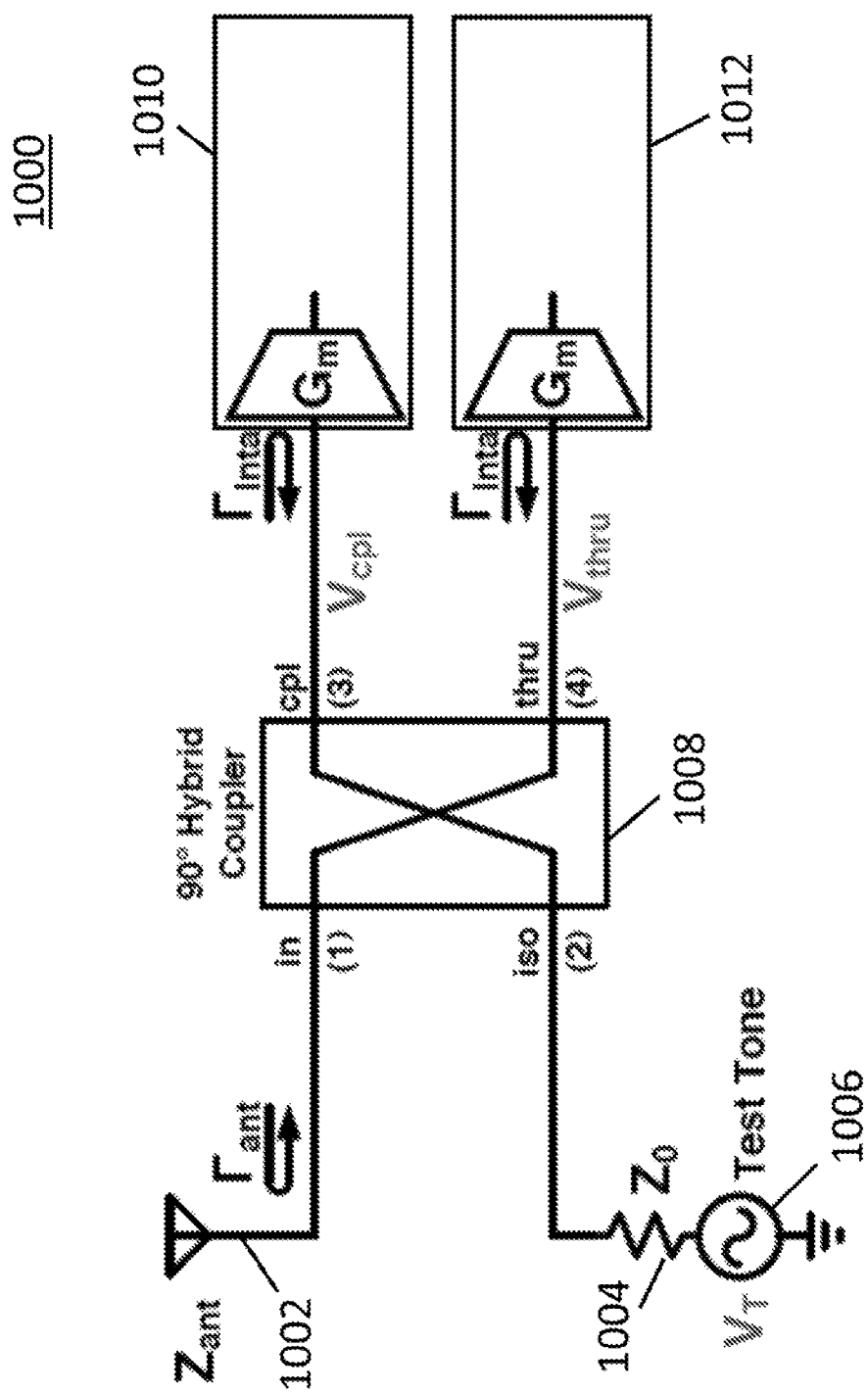
FIG. 10 is an example of a technique for antenna impedance measurement in accordance with some embodiments.

In accordance with some embodiments, the reflection coefficient of an antenna connected to a receiver as described herein can be measured. For example, as shown in FIG. 10, a configuration 1000 for measuring an antenna's reflection coefficient in accordance with some embodiments is shown. As illustrated, this configuration includes an antenna 1002, a termination resistor 1004, a test tone generator 1006, a quadrature hybrid 1008, and quadrature downconverters 1010 and 1012 (which can include the transconductors shown).

In this embodiment, the transconductors in quadrature downconverters 1010 and 1012 present largely capacitive input impedances, which results in a close-to-unity reflection coefficient $\Gamma_{Inta}$ at each transconductor. Thus, upon power being injected at the iso port, most of that power should be redirected to the in port of the quadrature hybrid and terminated at the antenna. However, if the antenna has non-perfect impedance, a wave will reflect from the antenna to the in port and then to the cpl port and the thru port. This reflection at the cpl port and the thru port can be measured as $V_{cpl}$ and $V_{thru}$, as shown in FIG. 10. Thus, by measuring the deviation of the phase/magnitude relationship of $V_{cpl}$ and $V_{thru}$, the reflection coefficient from the antenna can be measured.

In some embodiments, in order to measure the impedance of antenna 1002, a test tone can be injected into the iso port of the quadrature hybrid using test tone generator 1006. Voltages at the cpl port and the thru port of the quadrature hybrid can then be measured with the quadrature downconverters 1010 and 1012. Because the quadrature downconverters are driven with coherent local oscillator (LO) clocks, both the relative magnitude and phase difference of $V_{cpl}$ and $V_{thru}$ can be measured.

As described above in connection with FIG. 6, noise from a termination resistor $R_T$ can be cancelled out by a receiver in accordance with some embodiments. However, in some instances, non-idealities in the quadrature hybrid, the interconnections, the quadrature downconverters, the complex signal combiner, and the antenna impedance can cause non-perfect cancellation of this noise.

Figure 11:
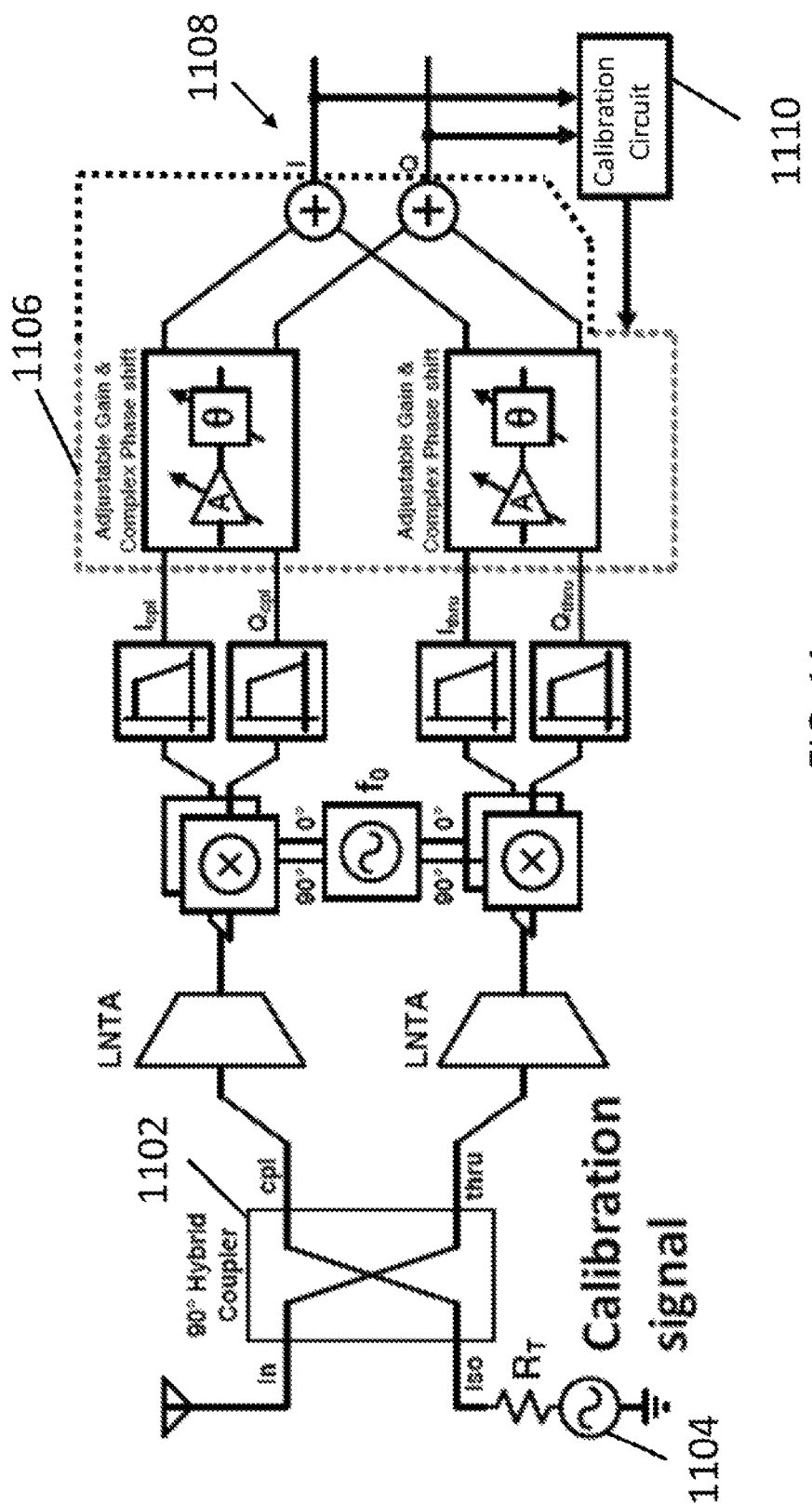
FIG. 11 is an example of a schematic of a receiver including a calibration circuit in accordance with some embodiments.

In some embodiments, as shown in FIG. 11, the cancellation of the noise can be improved by inserting a test tone at the iso port of quadrature hybrid 1102 using a test tone generator 1104 and tuning the phase and the gain of complex Cartesian combiner 1106 to minimize the combined complex baseband measured at I and Q output 1108 by calibration circuit 1110. In some embodiments, the calibration signal is not limited to a single tone. Rather, in some embodiments, a modulated and/or noise like signal can be used to reduce in-band spurious emission to the antenna.

The calibration circuit takes in the I and Q signals in analog or digital form and then outputs control signals for adjusting gain and complex phase shift. The calibration circuit can be implemented in any suitable manner. For example, the calibration circuit can be implemented using analog and/or digital circuits in some embodiments. As another example, the calibration circuit can be implemented using a hardware processor and software in some embodiments. In some embodiments, the calibration circuit can be part of another circuit.

Figure 12:
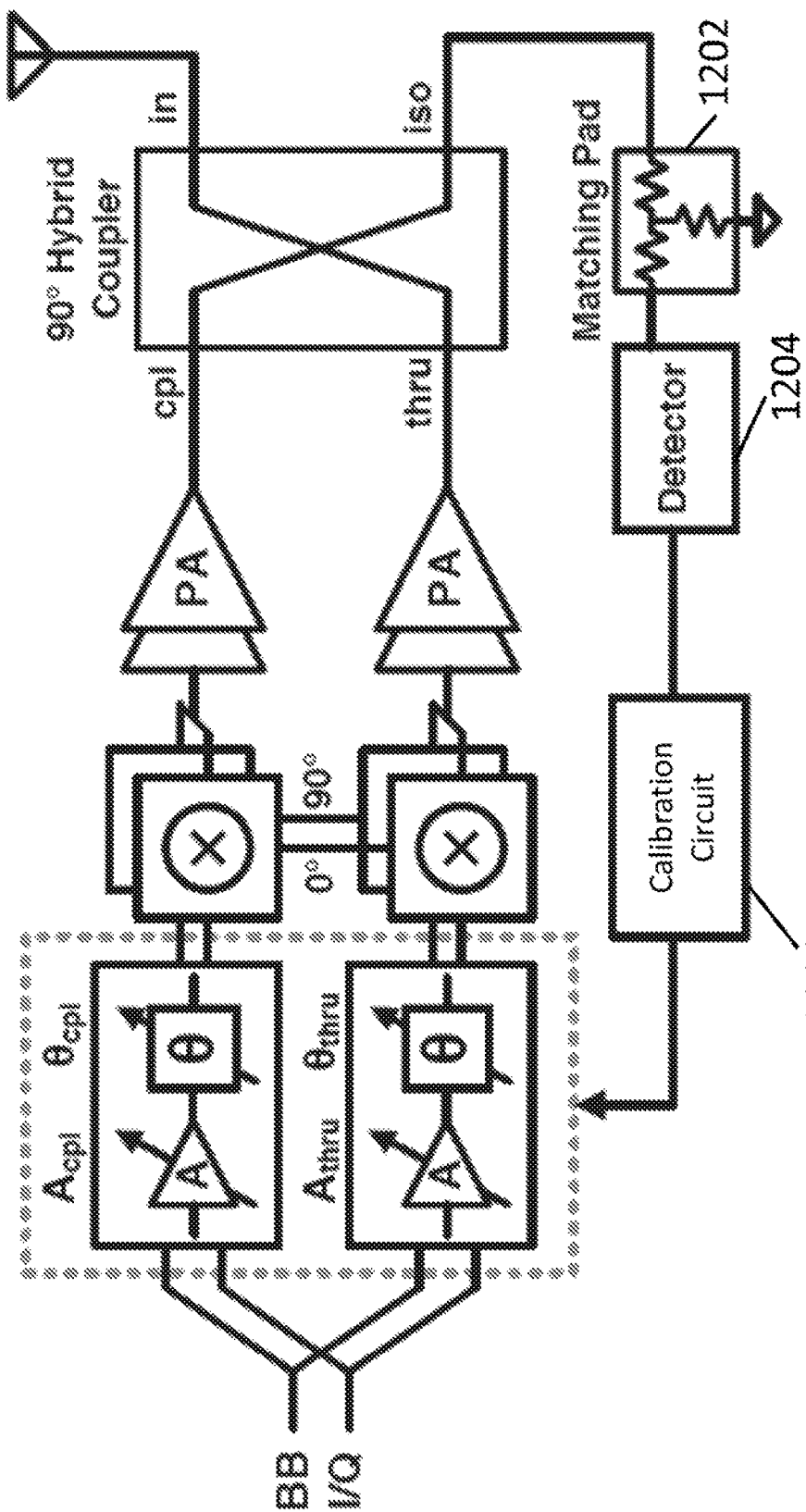
FIG. 12 is an example of a schematic of a transmitter including a calibration circuit in accordance with some embodiments.

Similarly, in some embodiments, a transmitter can be calibrated to improve its performance. With proper calibration, transmit power dissipation on the termination resistor of the transmitter can be minimized and the power added efficiency (PAE) of the power amplifiers of the transmitter can be improved. In some embodiments, for example, transmitter calibration can be performed by sensing the signal at the termination resistor and minimizing its power level by adjusting the coefficients of the complex combiner. As another example, in some embodiments, as shown in FIG. 12, baseband I and Q signals can be provided to the transmitter and then transmitted power leakage at the iso port (after the termination resistor is removed) can be measured using matching pad 1202 and detector 1204. The detected leakage power level can then be used by a calibration circuit 1206 to optimize the coefficients in the complex combiner so that the leakage power at the iso port is minimized.

The calibration circuit can be implemented in any suitable manner. For example, the calibration circuit can be implemented using analog and/or digital circuits in some embodiments. As another example, the calibration circuit can be implemented using a hardware processor and software in some embodiments. In some embodiments, the calibration circuit can be part of another circuit.

Figure 13:
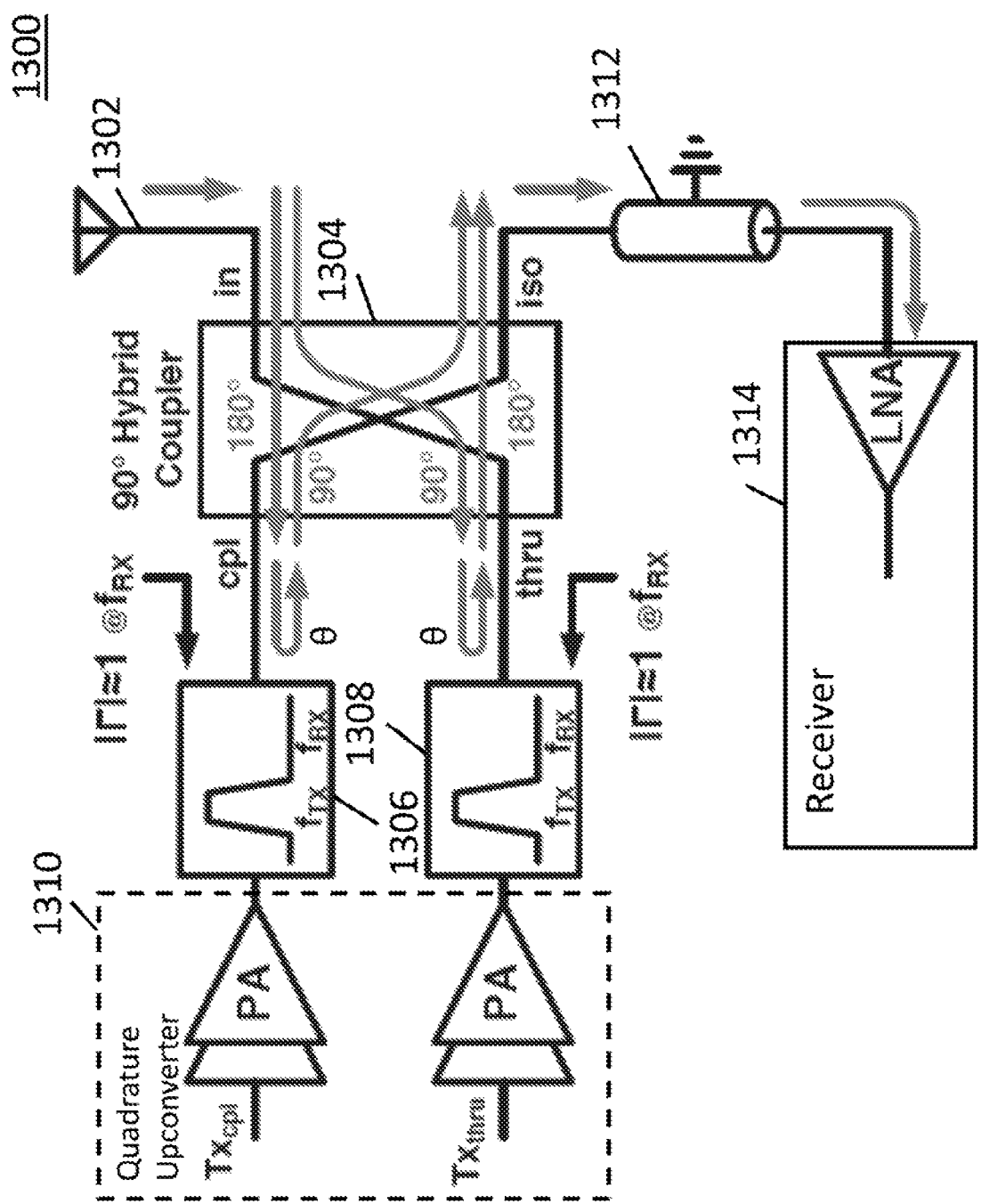
FIG. 13 is an example of a transceiver receiving a signal in accordance with some embodiments.

Turning to FIG. 13, an example 1300 of a transceiver in accordance with some embodiments is shown. As illustrated, transceiver 1300 includes an antenna 1302, a quadrature hybrid 1304, filters 1306 and 1308, a quadrature upconverter 1310, a connection 1312, and a receiver 1314.

Antennas 1302 can be any suitable antenna, in some embodiments. For example, in some embodiments, antenna 1302 and 202 can be an antenna suitable to receive any suitable one or more frequencies, or one or more ranges of frequencies, of signals.

Quadrature hybrids 1304 can be any suitable quadrature hybrid, in some embodiments. For example, in some embodiments, each can be implemented using a model X3C17A1-03WS surface mount quadrature hybrid available from ANAREN, INC. of East Syracuse, N.Y., USA. As another example, the quadrature hybrids can be implemented as described below in connection with FIGS. 38-43.

Filters 1306 and 1308 can be any suitable filters, in some embodiments. For example, in some embodiments, the filters can be SAW, BAW, or FBAR filters, cavity filters, ceramic filters, etc.

Connection 1312 can be any suitable connection between the quadrature hybrid and the receiver, in some embodiments. For example, in some embodiments, the connection can be a wire connection, a printed circuit board trace, a transmission line, etc.

Quadrature upconverter 1310 can be any suitable transmitter quadrature upconverter in some embodiments. For example, quadrature upconverter 1310 can be implemented using the components of quadrature upconverter 801 of FIG. 8 in some embodiments.

Receiver 1314 can be any suitable receiver.

As shown in FIG. 13, if the in port of the quadrature hybrid is connected to an antenna, the cpl port and the thru port of the quadrature hybrid are connected to filters, and the iso port of the quadrature hybrid is connected to a receiver, the quadrature hybrid can act as a duplexer.

As illustrated in FIG. 13, when a signal having a frequency $f_{RX}$ is received at the in port of quadrature hybrid 1304 from antenna 1302, the signal is split and sent to the cpl port and the thru port of the quadrature hybrid. Because filters 1306 and 1308 reflect signals at $f_{RX}$ as shown in FIG. 13, the signals are reflected back into the cpl port and the thru port to the iso port of the quadrature hybrid, connection 1312, and receiver 1314. As the signal propagates from the in port to the iso port, it undergoes a 270-plus-θ-degree phase shift.

Figure 14:
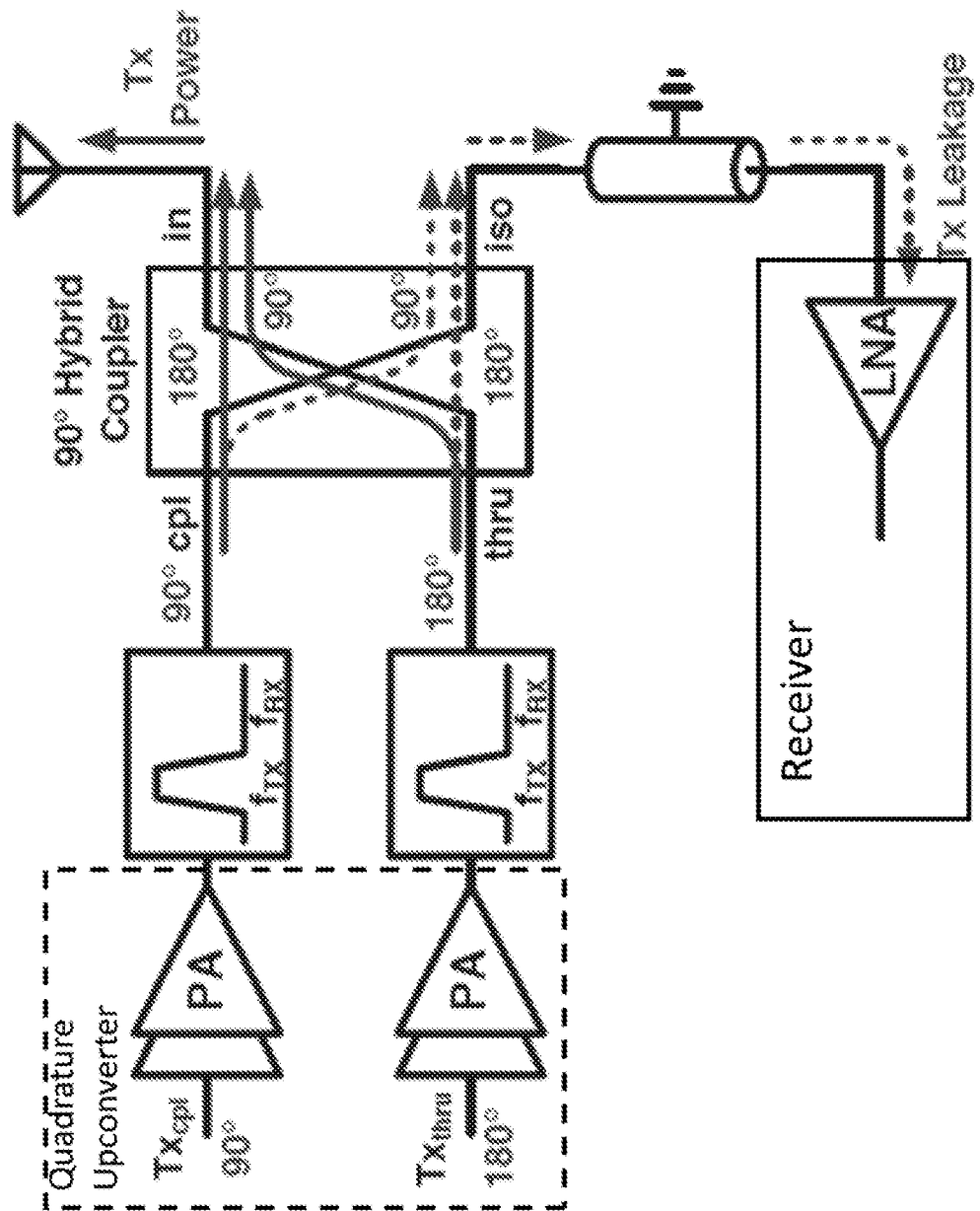
FIG. 14 is an example of a transceiver transmitting a signal in accordance with some embodiments.

As illustrated in FIG. 14, when a signal is transmitted from the quadrature upconverter through the filters, the signals received at the cpl port and the thru port are already shifted 90 degrees and 180 degrees, respectively. In the quadrature hybrid, these signals then undergo additional 180-degree and 90-degree, respectively, phase shifts (for a total phase shift of 270 degrees each) before exiting the in port of the quadrature hybrid and going to the antenna. A portion of the signals at the cpl port and the thru port may also be leaked to the iso port. However, because the signal from the cpl port undergoes a 90-degree phase shift (resulting in a total phase shift of 180 degrees) and because the signal from the thru port undergoes a 180-degree phase shift (resulting in a total phase shift of 360 degrees), the resulting signals at the iso port are 180 degrees out of phase and thus cancel out.

Figure 15:
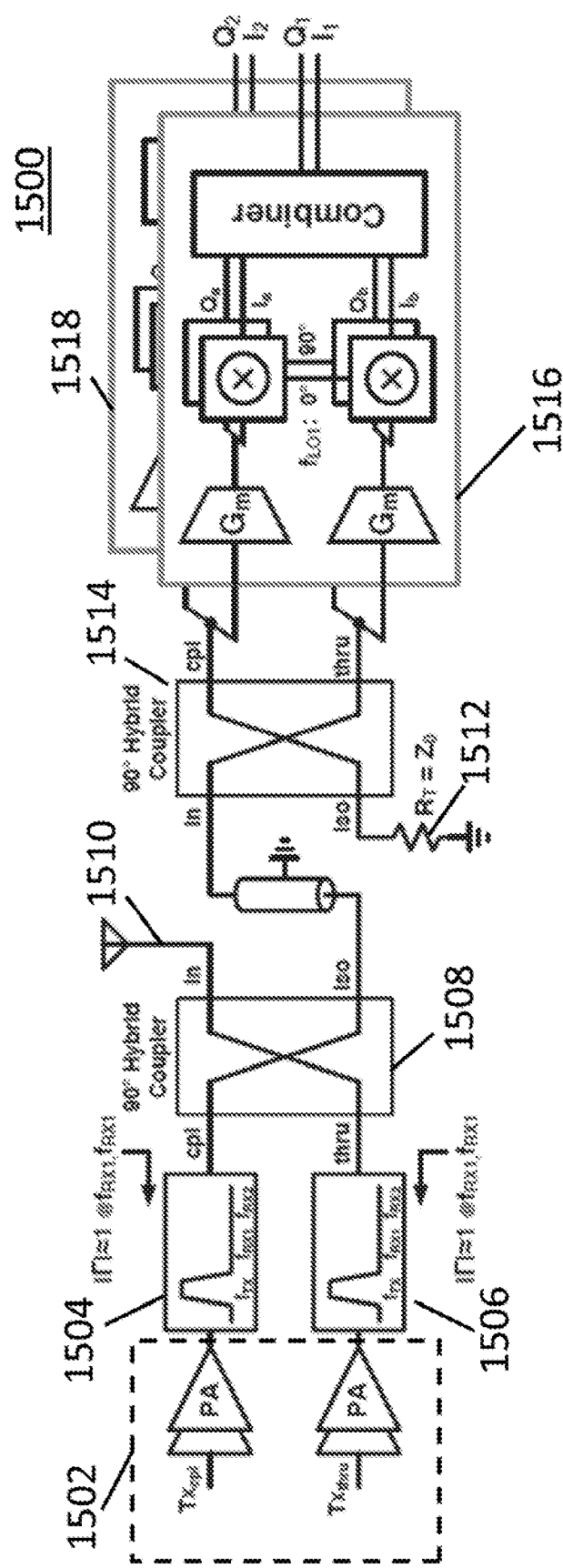
FIG. 15 is an example of a schematic of a transceiver in accordance with some embodiments.

FIG. 15 shows an example of a transceiver 1500, which can include a transmitter channel circuitry 1502 (which can include a complex combiner (not shown) and two quadrature upconverters (only power amplifiers shown)), two filters 1504 and 1506, quadrature hybrids 1508 and 1514, an antenna 1510, a termination resistor 1512, and receiver channel circuitries 1516 and 1518 (each including two quadrature downconverters and a complex combiner) in accordance with some embodiments. These components can be implemented in a similar manner to similarly named components of other figures in some embodiments.

Figure 16:
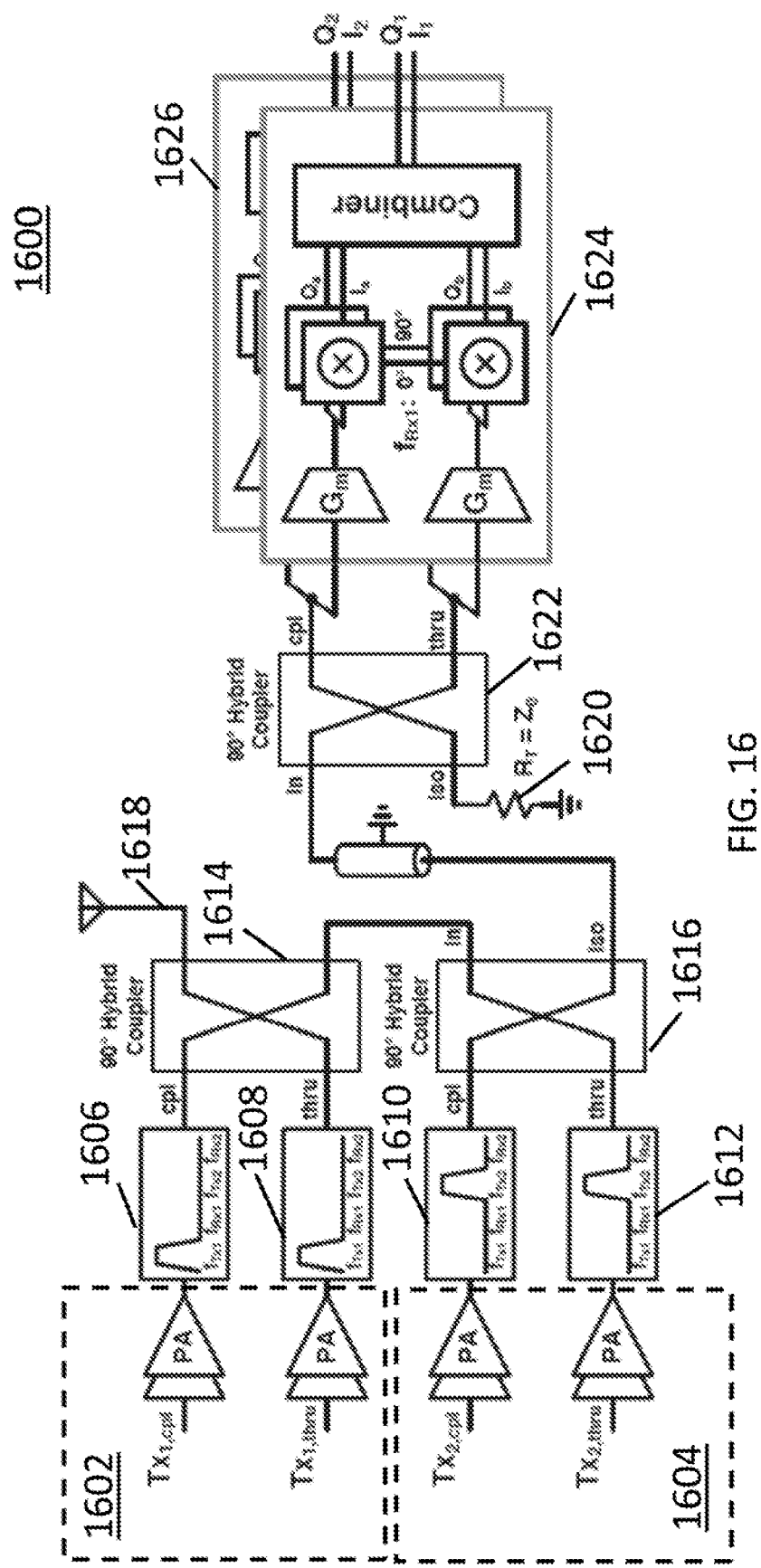
FIG. 16 is an example of a schematic of another transceiver in accordance with some embodiments.

FIG. 16 shows an example of a transceiver 1600, which can include transmitter channel circuitries 1602 and 1604 (which can include a complex combiner (not shown) and two quadrature upconverters (only power amplifiers shown)), four filters 1606, 1608, 1610, and 1612, quadrature hybrids 1614, 1616, and 1622, an antenna 1618, a termination resistor 1620, and receiver channel circuitries 1624 and 11626 (each including two quadrature downconverters and a complex combiner) in accordance with some embodiments. These components can be implemented in a similar manner to similarly named components of other figures in some embodiments.

Although specific configurations of transmitters and receivers are presented herein for purposes of illustration of possible transceivers, it should be apparent that any suitable number of transmitters and any suitable numbers of receivers can be included in a transceiver in accordance with some embodiments.

Figure 17:
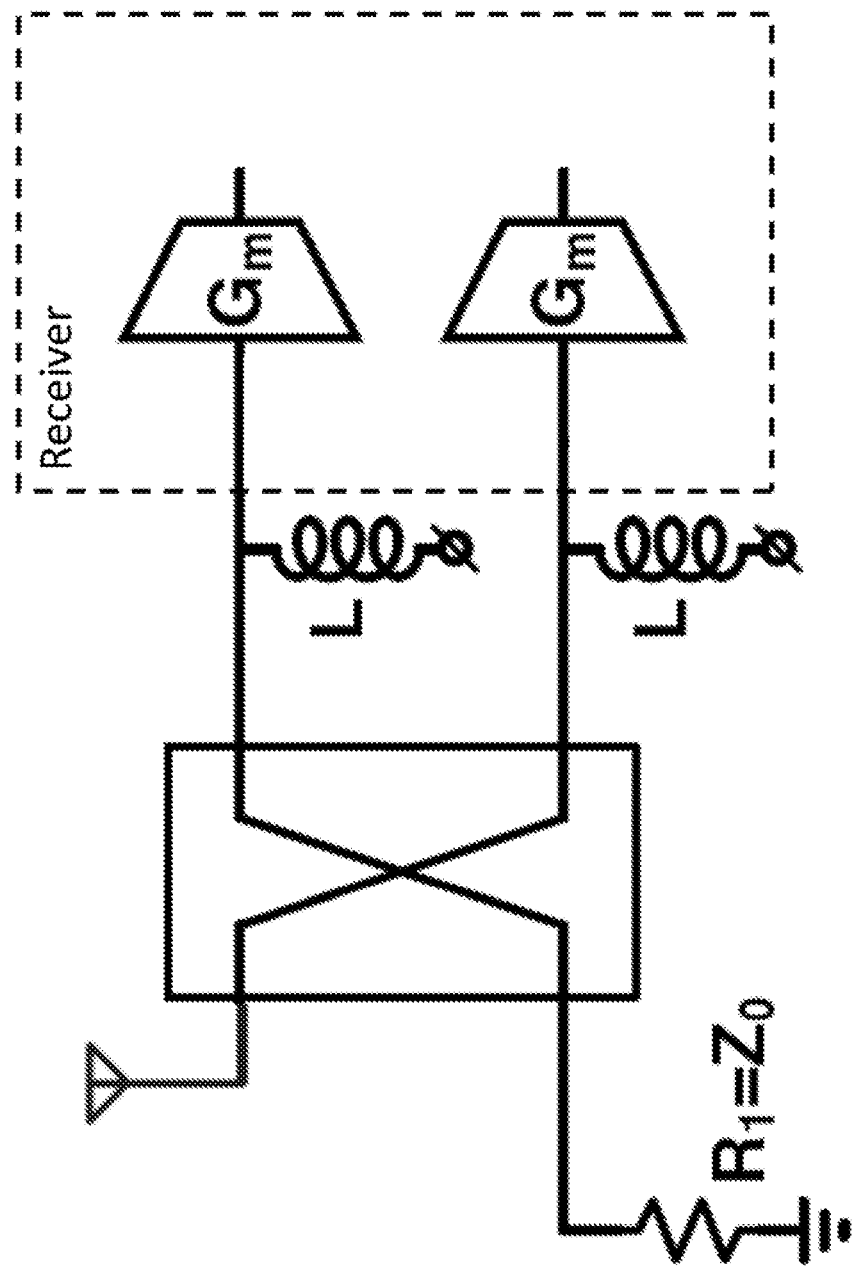
FIG. 17 is an example of a schematic of inductors at cpl and thru ports of a 90-degree hybrid coupler in accordance with some embodiments.

In some embodiments, to improve the achievable bandwidth in receivers as described herein, inductors can be placed at the inputs to the LNTA transconductances (Gms) as shown in FIG. 17. Because inductors configured in this way are parallel with the input capacitance of the LNTA Gms, they can be used to resonate out that capacitance at higher frequencies.

Figure 18:
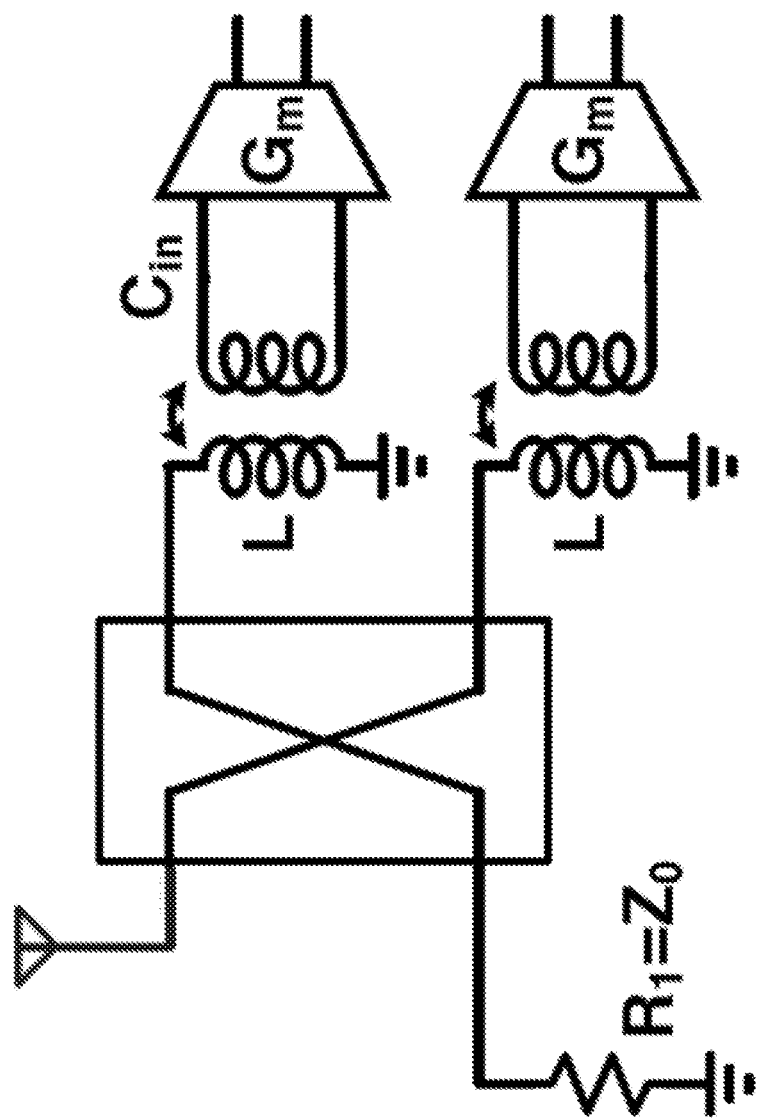
FIG. 18 is an example of a schematic of transformers at cpl and thru ports of a 90-degree hybrid coupler in accordance with some embodiments.

In some embodiments, as shown in FIG. 18, transformers can be placed at the inputs to the LNTA Gms to resonate out the input capacitance of the LNTA Gms. Any suitable turn ratio (e.g., 1:1, or any other suitable value) between the primary and secondary windings can be used in some embodiments. Higher turn ratios may give passive voltage gain and improve the noise figure, but may also reduce the bandwidth of the receiver.

Figure 19:
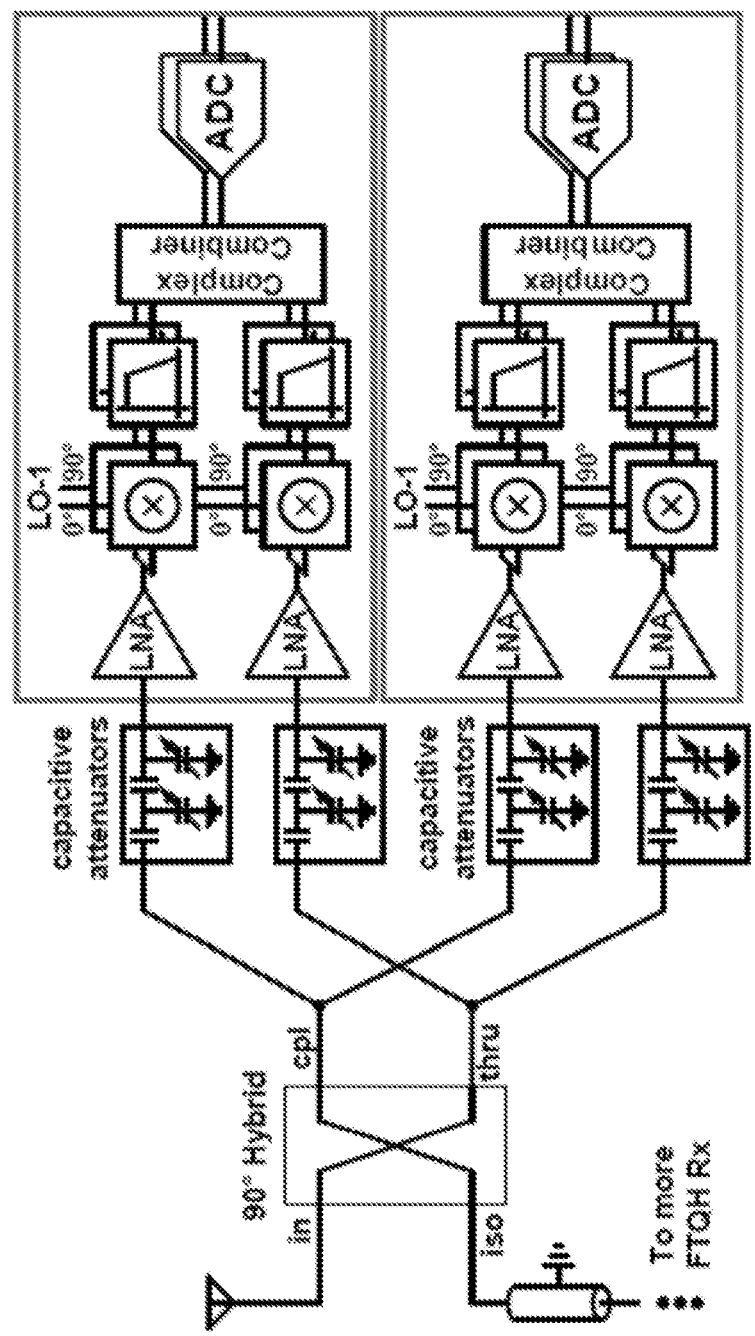
FIG. 19 is an example of a schematic of capacitive attenuators at cpl and thru ports of a 90-degree hybrid coupler in accordance with some embodiments.

In some embodiments, as shown in FIG. 19, capacitive attenuators can be placed at the inputs to the quadrature downconverters to improve receiver linearity. Although FIG. 19 shows one capacitive attenuator for each quadrature downconverter input, in some embodiments a single capacitive attenuator can be placed between the inputs of each quadrature downconverter. It is also possible to share the same attenuator between the two parallel LNAs.

FIG. 20 illustrates an example 2001 of an integrated circuit that can be provided in some embodiments. Also illustrated are an antenna 2002, a quadrature hybrid 2004, a termination resistor 2006, common source (CS) LNTAs 2008, mixers 2014, multiplexers 2012, divide-by-four circuits 2010, field programmable transimpedance amplifiers 2016, harmonic combiners 2018, transimpedance amplifiers 2020, and complex combiners 2022.

Antenna 2002, quadrature hybrid 2004, and termination resistor can be implemented as described in connection with the other figures in some embodiments.

Each CS LNTA 2008 can be formed from any suitable number (e.g., 16) of slices in some embodiments. Each slice can be implemented as shown in slice 2024 in some embodiments.

Each mixer 2014 can be formed from any suitable number (e.g., 8) of mixer drivers in some embodiments. Each mixer driver can be implemented as shown in mixer driver 2026 in some embodiments.

Each multiplexer 2012 can be implemented in any suitable manner in some embodiments.

Each divide-by-four circuit 2010 can be implemented in any suitable manner in some embodiments.

Each field programmable transimpedance amplifier can be implemented in any suitable manner, such as shown in the figure, in some embodiments.

Each harmonic combiner can be implemented in any suitable manner, in some embodiments.

Each transimpendance amplifier 2020 can be implemented in any suitable manner, such as shown in the figure, in some embodiments.

Each complex combiner 2022 can be implemented in any suitable manner, in some embodiments. For example, the complex combiner can be implemented using a network of variable transconductors as shown in the figure.

In integrated circuit 2001, two independent receiver channels (A and B) share quadrature hybrid 2004. In some embodiments, channel A and B can operate independently with different local oscillator (LO) frequencies or can be driven synchronously with a coherent LO so that the two channels can be combined to further reduce the noise factor.

In some embodiments, the multi-slice programmable current-reuse CS LNTAs 2008 enable adaptive, in-the-field adjustments of the transconductance (Gm) to reduce power consumption when high sensitivity is not needed. As shown, LNTAs 2008 drive 8-phase current-mode passive mixers 2014 clocked by 12.5%-duty-cycle non-overlapping clock signals. The down-converted currents are then filtered and amplified by the inverter-based field programmable TIAs 2016 with programmable bandwidth, gain and power consumption. Harmonic rejecting resistive networks 2018 and TIAs 2020 recombine the 8-phase baseband signal to reject 3rd and 5th order LO harmonics and reduce noise folding from the harmonics. The fully differential I and Q baseband signals from the cpl path and the thru path are then recombined with a phase shift, which is nominally 90 degrees, by complex combiner 2022. The phase and magnitude imbalances of quadrature hybrid 2004 can be corrected in the complex combiner to improve cancellation of the termination resistor noise.

In some embodiments, integrate circuit 2001 can be designed and fabricated in a 65 nm GP CMOS technology. In some embodiments, the LO frequency can be set between 600 MHz and 2200 MHz.

Figure 21:
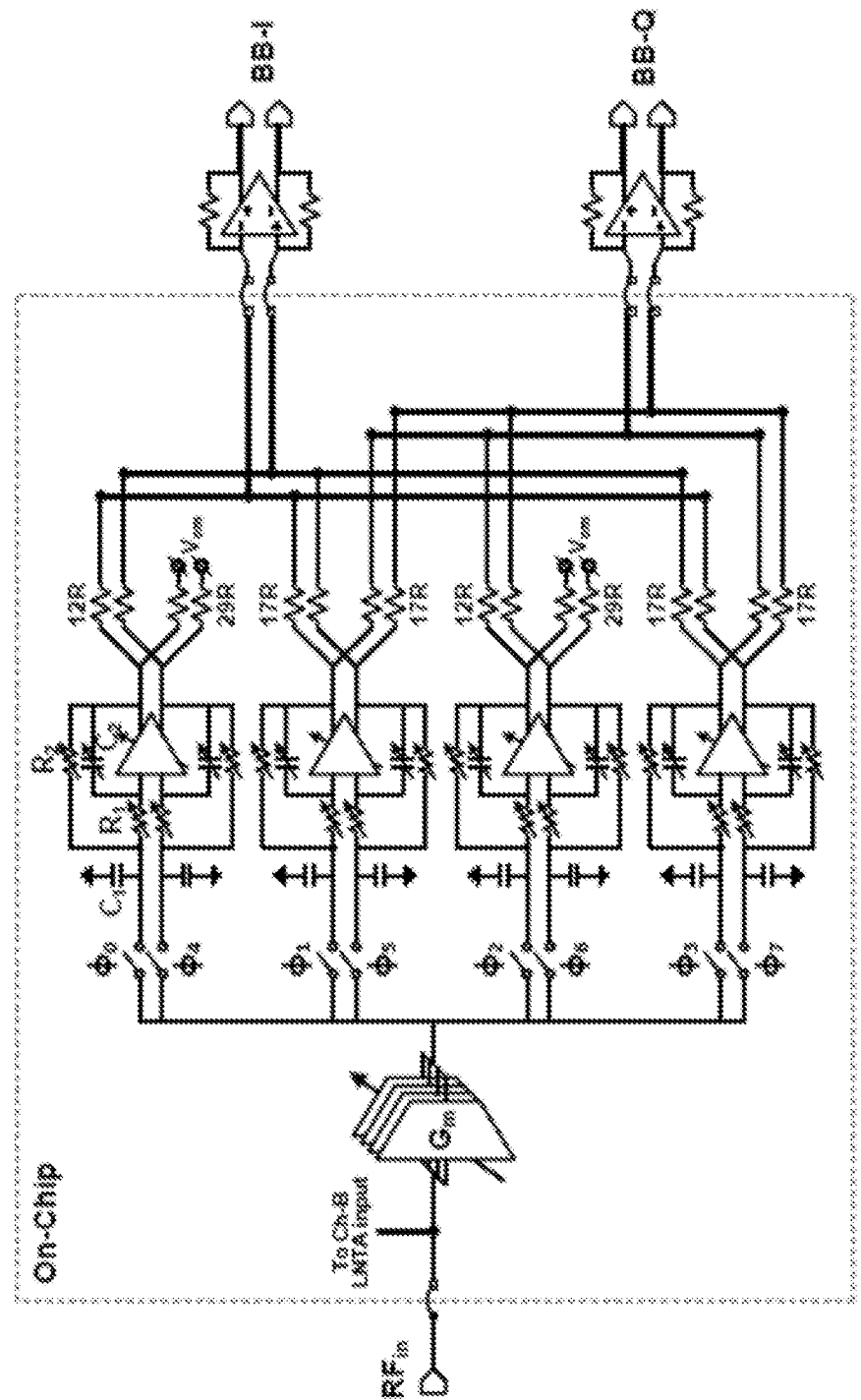
FIG. 21 is an example of a schematic of more detailed connections in an integrated circuit in accordance with some embodiments.

FIG. 22 shows more details of the connection a quadrature down-conversion chain of channel A of FIG. 21 in accordance with some embodiments. In this figure, the values 12R, 29R, and 17R represent relative resistor values. For example, if R is selected to be 1 k ohm, then 12R is 12 k ohm, 29R is 29 k ohm, and 17R is 17 k ohm.

Figure 23:
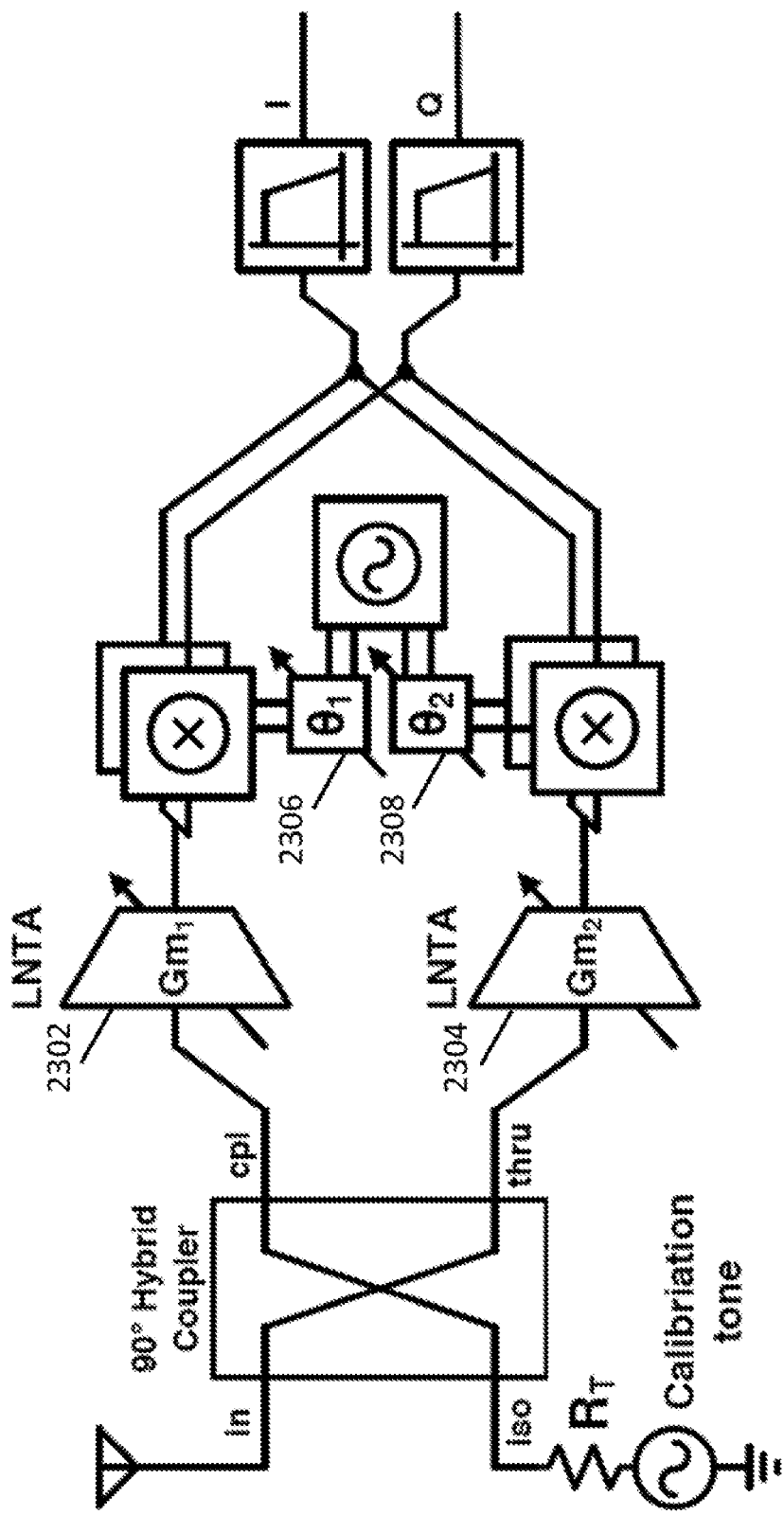
FIG. 23 is an example of a schematic of a receiver using polar recombination in accordance with some embodiments.

In some embodiments, rather than performing gain and phase adjustments in a complex Cartesian combiner as shown, for example, in FIG. 11, polar recombination can be used to perform phase calibration in the LO path and gain calibration in the LNTA. For example, as shown in FIG. 23, this can be implemented using variable gain LNTAs 2302 and 2304 and variable phase shifters 2306 and 2308.

Figure 24:
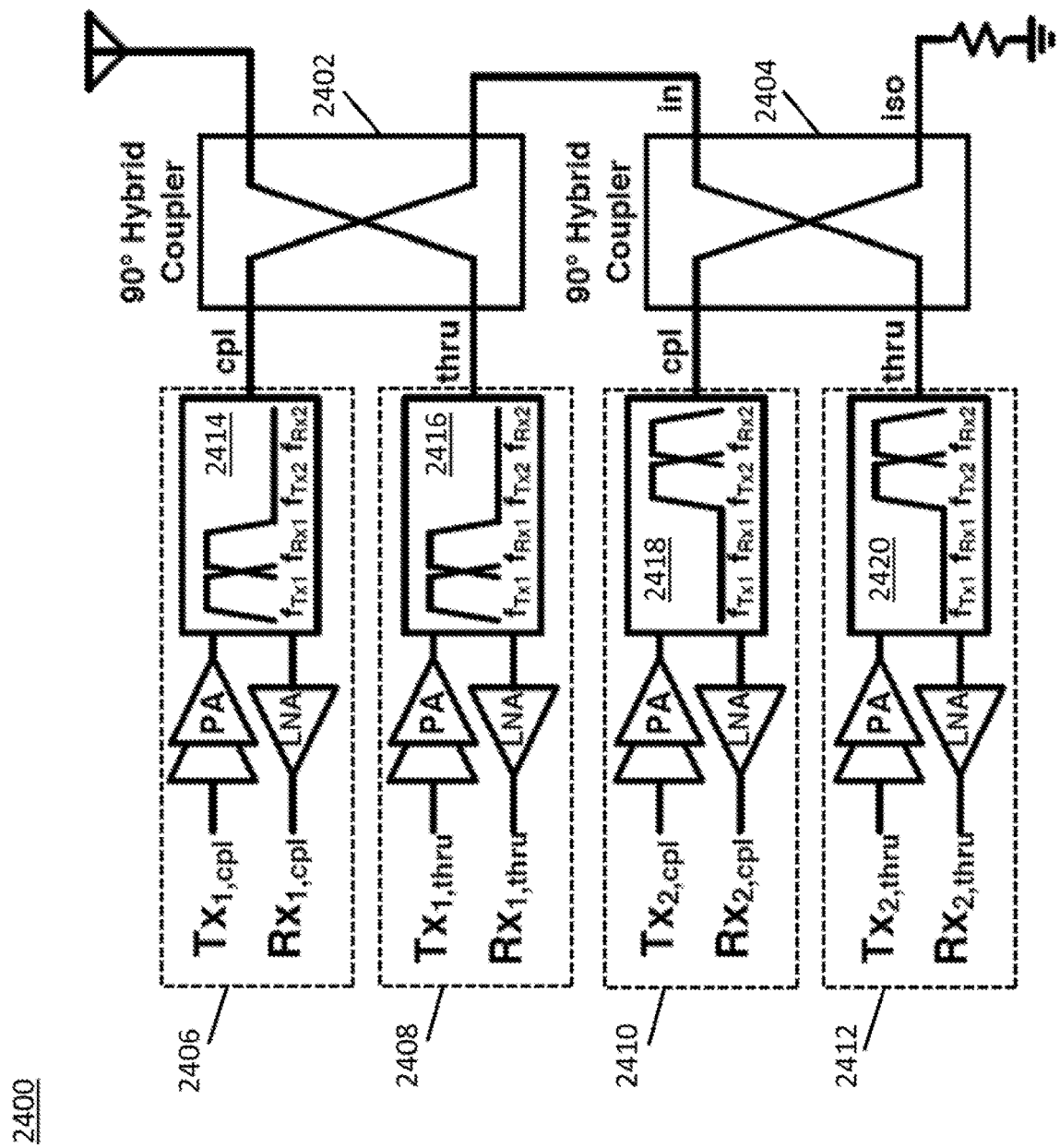
FIG. 24 is an example of a schematic of a transceiver using frequency division duplexers in accordance with some embodiments.

As shown in FIG. 24, in accordance with some embodiments, a transceiver 2400 can be configured using multiple hybrid couplers 2402 and 2404 each of which is connected to two identical frequency division duplexers. More particularly, duplexers 2406 and 2408 can be connected to the cpl and thru ports, respectively, of hybrid coupler 2402 and each can be configured to transmit on a frequency $f_{Tx1}$ and receive on a frequency $f_{Rx1}$, both frequencies of which are passed by filters 2414 and 2416 while the filters block frequencies $f_{Tx2}$ and $f_{Rx2}$. Likewise, duplexers 2410 and 2412 can be connected to the cpl and thru ports, respectively, of hybrid coupler 2404 and each can be configured to transmit on a frequency $f_{Tx2}$ and receive on a frequency $f_{Rx2}$, both frequencies of which are passed by filters 2418 and 2420 while the filters block frequencies $f_{Tx1}$ and $f_{Rx1}$. Although only two hybrid couplers are shown in FIG. 24, any suitable number of hybrid couplers can be daisy chained in the manner illustrated in FIG. 5 for example.

Figure 25:
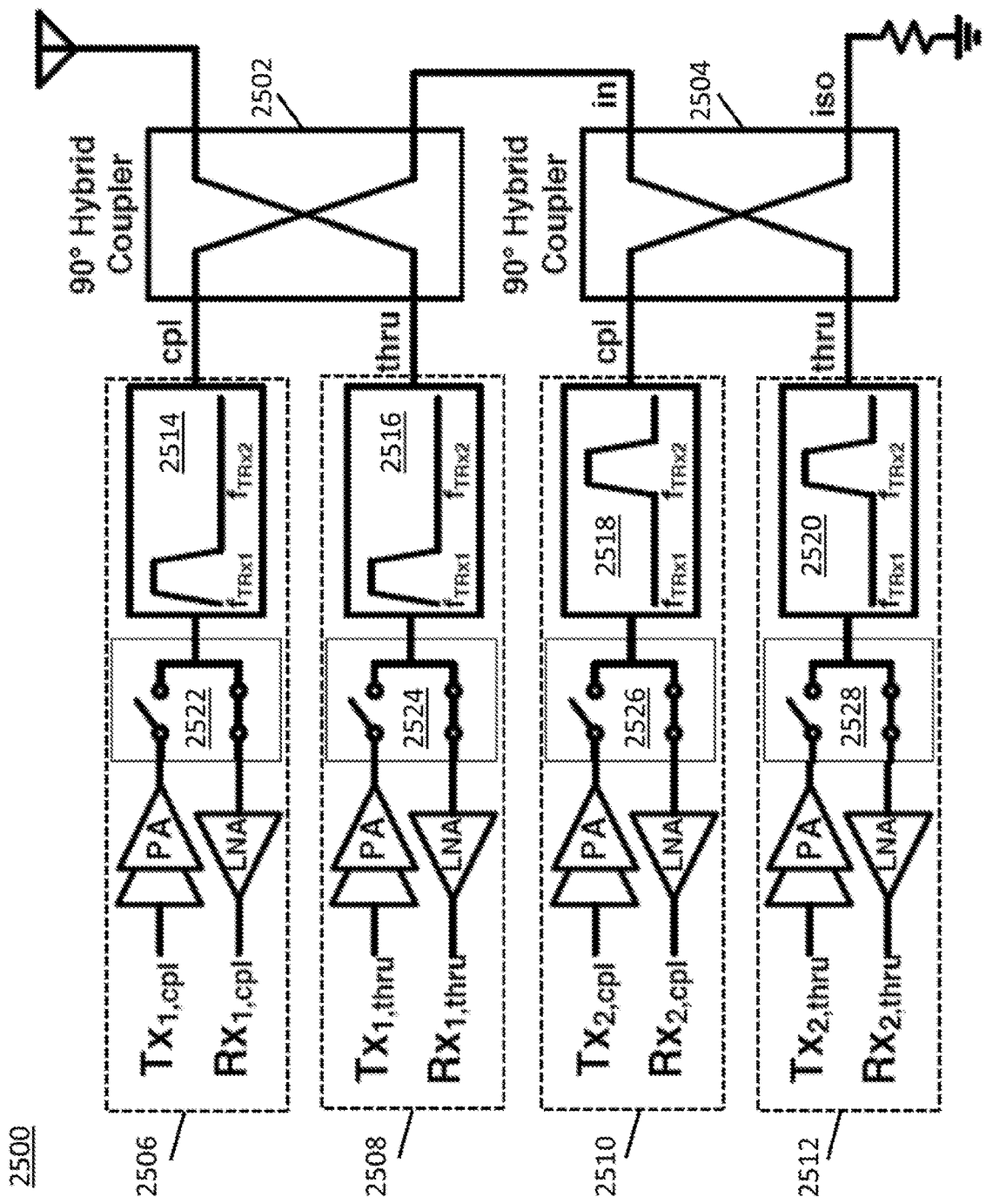
FIG. 25 is an example of a schematic of a transceiver using time division duplexers in accordance with some embodiments.

Alternatively to using frequency division duplexers as shown in FIG. 24, time division duplexers can be used in a transceiver as shown in FIG. 25. More particularly, in a transceiver 2500, each of hybrid couplers 2502 and 2504 can be connected to two identical time division duplexers. Hybrid coupler 2502 can be connected to duplexers 2506 and 2508 at its cpl and thru ports, respectively. Hybrid coupler 2504 can be connected to duplexers 2510 and 2512 at its cpl and thru ports, respectively. Filters 2514 and 2516 in duplexers 2506 and 2508, respectively, can pass a frequency $f_{TRx1}$ at which these duplexers transmit and receive, while blocking a frequency $f_{TRx2}$ at which other duplexers transmit and receive. Likewise, filters 2518 and 2520 in duplexers 2510 and 2512, respectively, can pass a frequency $f_{TRx2}$ at which these duplexers transmit and receive, while blocking a frequency $f_{TRx1}$ at which other duplexers transmit and receive. Switches 2522, 2524, 2526, and 2528 control when the duplexers are able to transmit and receive. Although only two hybrid couplers are shown in FIG. 25, any suitable number of hybrid couplers can be daisy chained in the manner illustrated in FIG. 5 for example.

Figure 26:
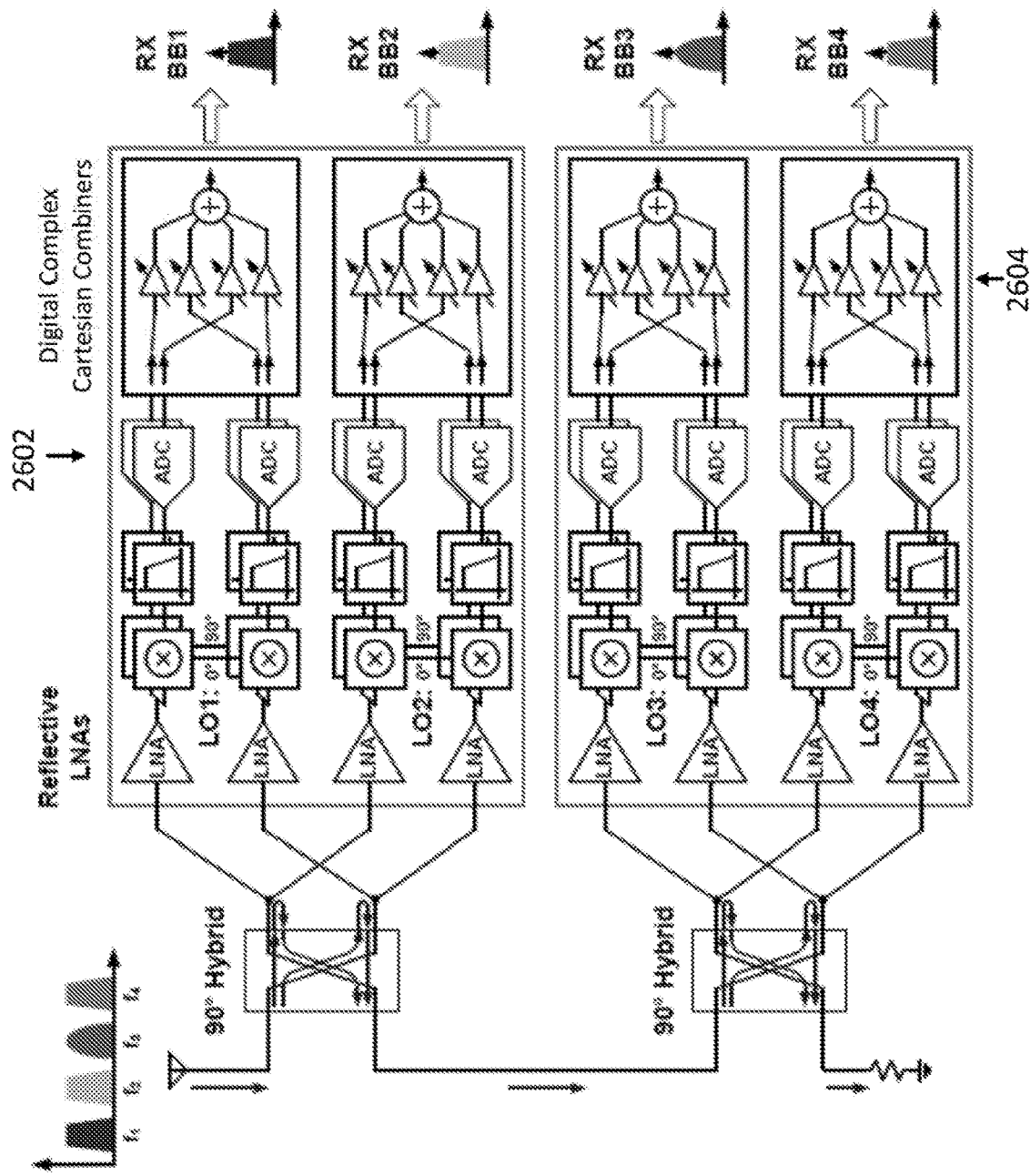
FIG. 26 is an example of a schematic of a receiver implementing a complex Cartesian combiner in the digital domain in accordance with some embodiments.
Figure 27:
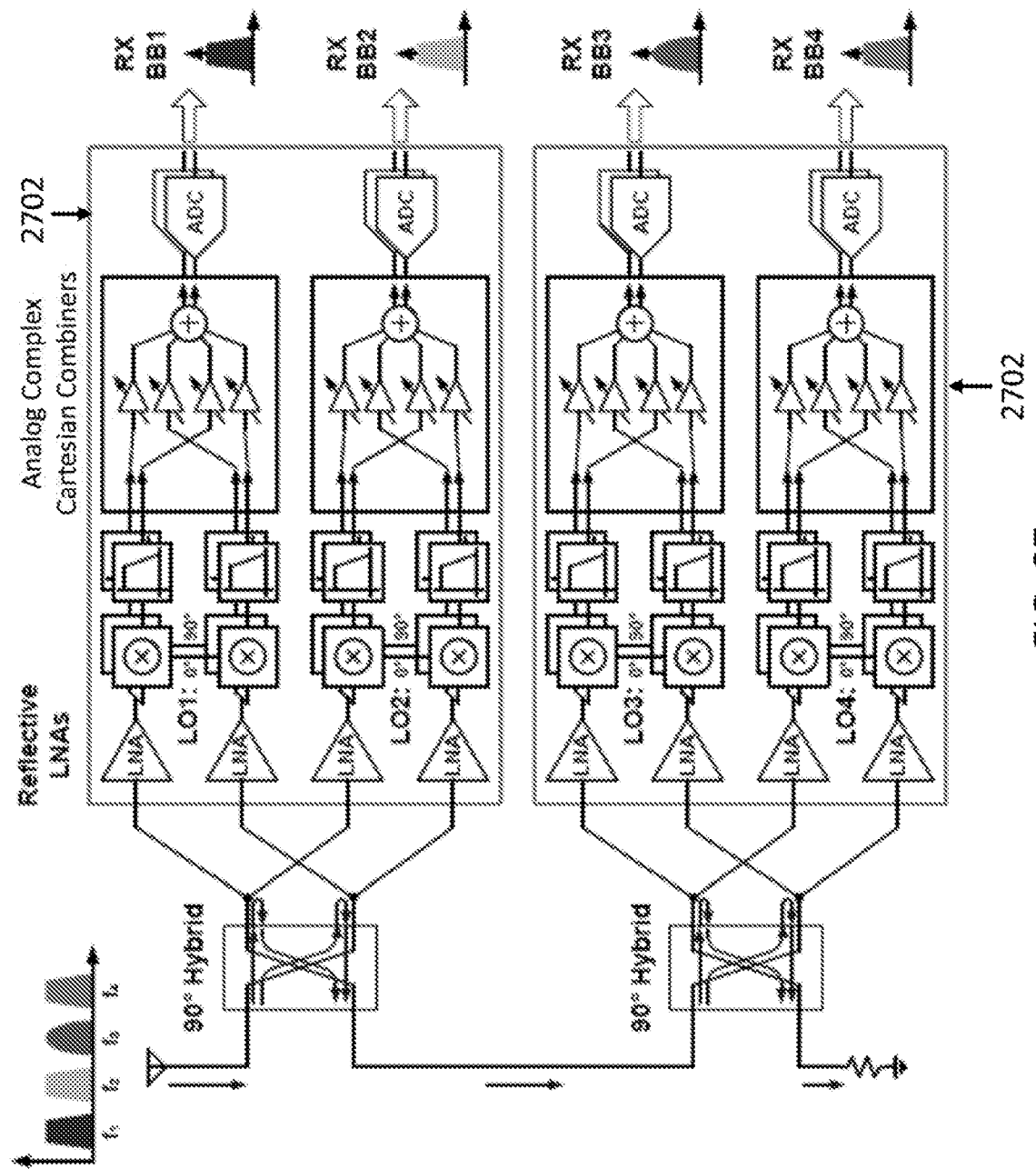
FIG. 27 is an example of a schematic of a receiver implementing a complex Cartesian combiner in the analog domain in accordance with some embodiments.

As described above, in some embodiments, a complex Cartesian combiner can be used to cancel out noise from a termination resistor of a hybrid coupler or hybrid coupler daisy chain. As shown in FIGS. 26 and 27, the complex Cartesian combiner can be implemented in the digital domain (FIG. 26) or the analog domain (FIG. 27).

As shown in FIG. 26, when the complex Cartesian combiners are implemented in the digital domain, analog to digital converters (ADCs) 2602 can be provided at the inputs to digital complex Cartesian combiners 2604 to convert signals going into the combiners into the digital domain. The digital complex Cartesian combiners can then receive these signals, provide the necessary gain adjustment and phase shift, and combine the signals. In some embodiments, equalization can be introduced in the combiner to better accommodate frequency-dependent combining coefficients. The combiners can be implemented in any suitable hardware, such as a digital signal processor.

As shown in FIG. 27, when the complex Cartesian combiners are implemented in the analog domain, analog circuitry 2704 (such as variable gain amplifiers, variable phase shifters, and summing nodes) can perform the complex Cartesian combining, and then analog to digital converters (ADCs) 2702 can be provided at the outputs of analog complex Cartesian combiners 2704 to convert signals coming out of the combiners into the digital domain.

Figure 28:
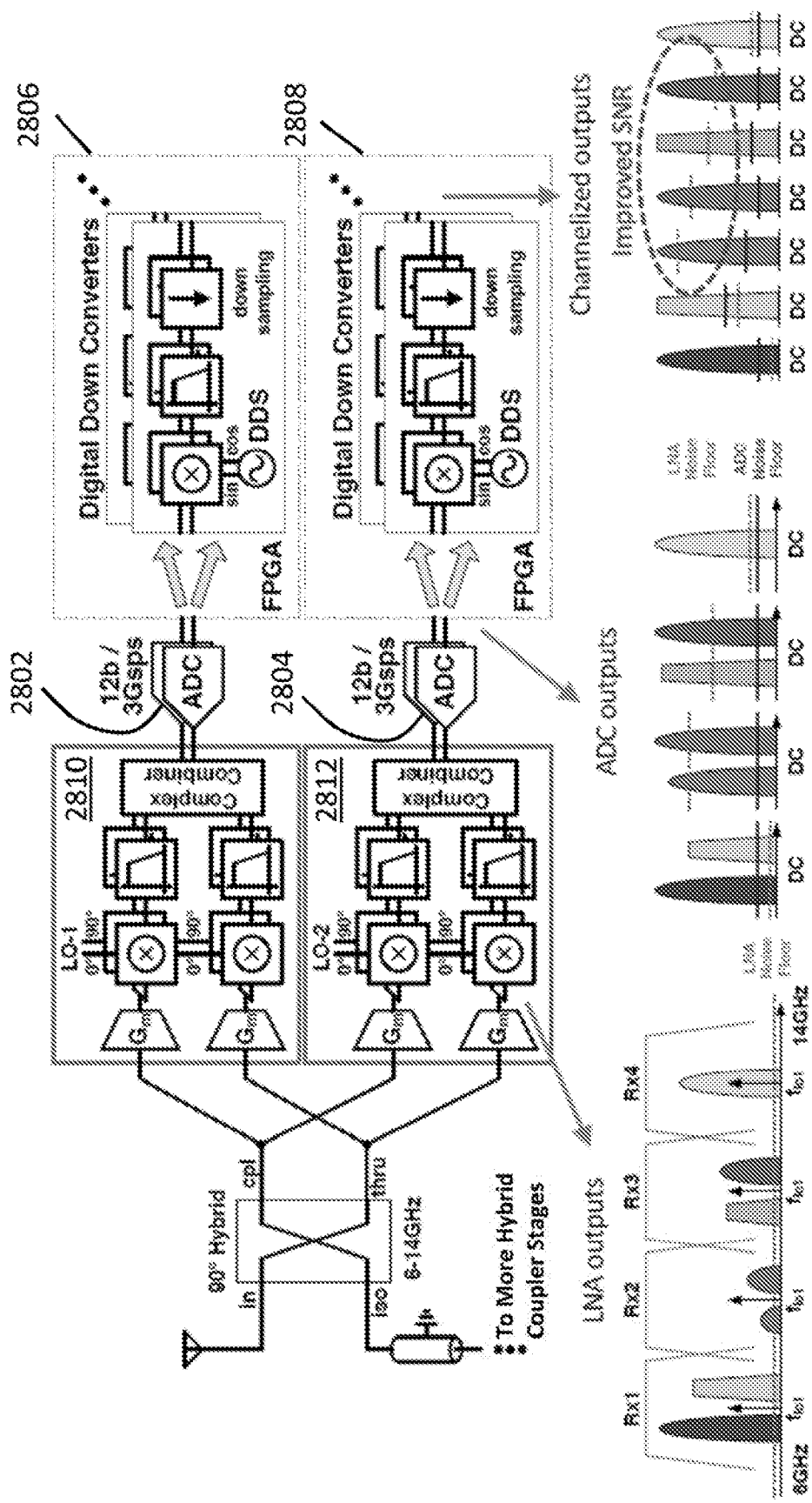
FIG. 28 is an example of a schematic of a receiver incorporating digital down converters in accordance with some embodiments.

As shown in FIG. 28, analog to digital converters (ADCs) 2802 and 2804 and digital down converters 2806 and 2808 can be provided at the outputs of the complex combiners in some embodiments. As also illustrated in FIG. 28, a frequency range from 6 GHz to 14 GHz can be received by four receiver channels (Rx1, Rx2, Rx3, and Rx4) in an array with two stages 2810 and 2812 each with two parallel channels. The actual implementation is not limited to this example and the number of channels and the array configuration can be changed.

As shown, the spectrum from 6 GHz to 14 GHz is split into four smaller segments before captured by the ADCs. Thus, ADCs with high accuracy and resolution can be used to achieve higher dynamic range within each spectrum segment. Each receiver channel can have independent automatic gain control mechanisms to scale the received signal to appropriate levels before being sampled by the ADCs. Thus, the weak signals can be amplified with large gain and the signal to noise ratio (SNR) improved. If signals exist at the transition frequencies between each receiver channel, digital signal processing algorithms can be used to correlate the captured waveforms and stitch them into a contiguous spectrum.

Although the receivers shown in FIG. 28 are configured such that all the receiver channels are adjacent to each other to cover a contiguous spectrum segment, the receivers can be configured into a segmented real-time spectrum capture mode to address situations in which the spectrum is sparse and segmented, and/or in which the user is only interested in certain non-contiguous frequency bands.

In some embodiments, the LO frequency and bandwidth of each receiver can be configured independently. Thus, one receiver channel can be dedicated to each desired spectrum segment and perform real-time capture. For example, for the same spectrum shown in FIG. 28, if one is only interested in the signals inside the ranges of receiver channels 1 and 3, channels 2 and 4 can be turned off to save power.

Figure 29:
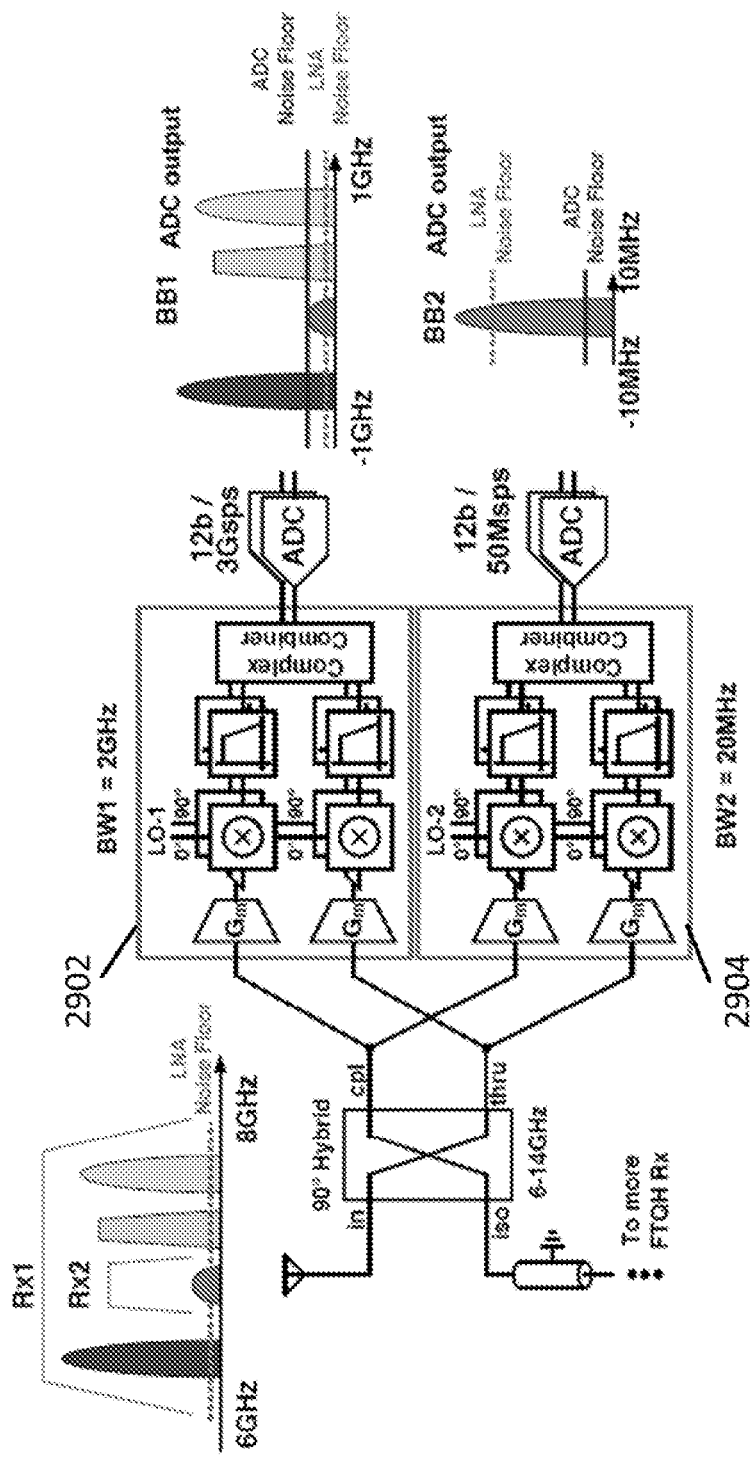
FIG. 29 is an example of a schematic of a receiver having different channels with different performance characteristics in accordance with some embodiments.

In some embodiments, it may be necessary or desirable to monitor a wide frequency span for the overall spectrum profile while focusing on a small region of the spectrum with much higher sensitivity to reveal and analyze a weak signal. FIG. 29 illustrates an example of a receiver architecture for doing this. As shown, receiver channel 2902 is configured for a large bandwidth (2 GHz) and lower gain for wideband spectrum profile monitoring including band Rx1. Receiver channel 2904 is configured with lower bandwidth (20 MHz) but higher gain and sensitivity to capture the weak signal in band Rx2.

The operating frequency range of a receiver array incorporating one or more quadrature hybrids is limited by the bandwidth of the quadrature hybrid(s). A quadrature hybrid implemented with coupled transmission lines can achieve one octave of bandwidth. Multi-section designs can extend the bandwidth to several octaves at the cost of additional insertion loss. To relax the challenge of implementing ultra-wideband quadrature hybrids, receiver arrays that split the input spectrum into multiple segments with a wideband RF multiplexer can be provided. The relative bandwidth of each spectrum segment can be limited to several octaves so that it can be handled with practical quadrature hybrid designs.

Figure 30:
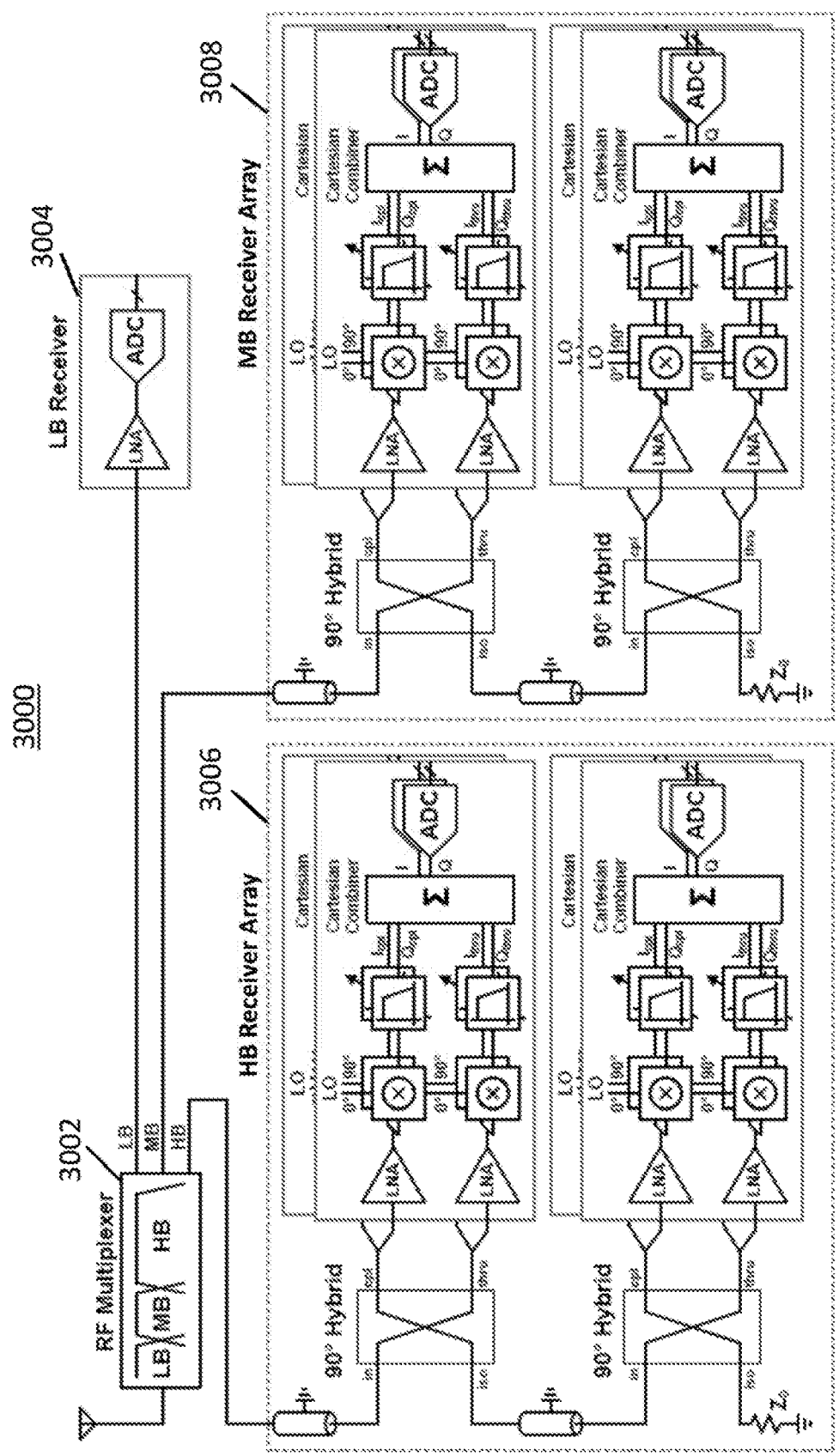
FIG. 30 is an example of a schematic of a receiver with a three-band RF multiplexer in accordance with some embodiments.

FIG. 30 shows an example of a receiver 3000 with a three-band RF multiplexer 3002. The RF multiplexer splits the received signals into three frequency bands: low band (LB); middle band (MB); and high band (HB). The LB frequency range goes down to DC and the whole band can be captured directly with a wideband ADC after a wideband LNA in circuit 3004. The MB and HB can be captured with two separate receiver arrays 3006 and 3008, respectively.

Figure 31:
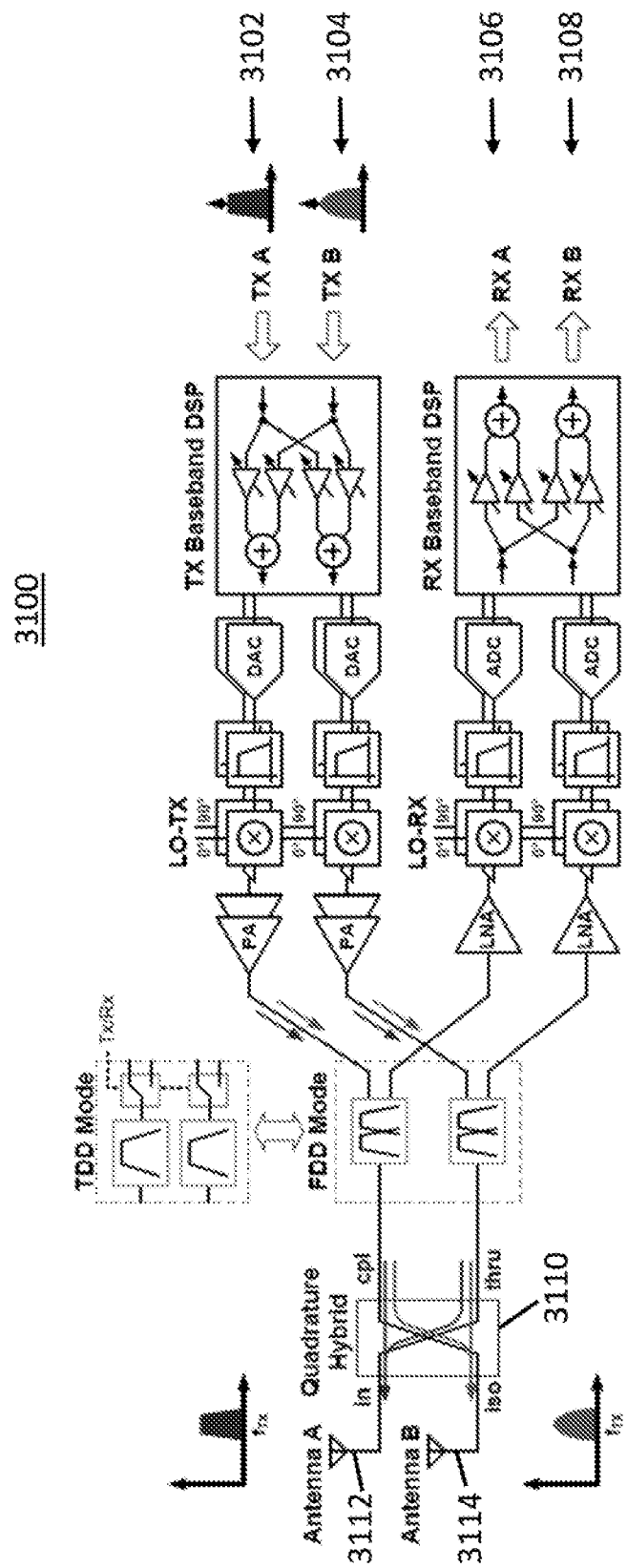
FIG. 31 is an example of a schematic of a 2×2 MIMO transceiver in accordance with some embodiments.

Turning to FIG. 31, and example of a 2×2 MIMO transceiver 3100 in either the frequency division duplex (FDD) mode or time division duplex (TDD) mode is illustrated. As shown, the transceiver has two coherent transmitter paths 3102 and 3104 and two coherent receiver paths 3106 and 3108 connected to the thru and cpl ports of quadrature hybrid 3110. Two wideband antennas 3112 and 3114 are connected to the in and iso ports, respectively, of quadrature hybrid 3110. In some embodiments, the digital complex Cartesian combiners can be implemented in a digital signal processor (DSP) for RF impairment mitigation as well as steering of the RF transmit power to the antennas with different power levels.

In some embodiments, when transmitting in diversity mode, if one of the antennas suffers from significant fading, the transmitter power can be steered to the other antenna with a simple digital baseband phase shift. Thanks to a passive power combining feature of the quadrature hybrid, the transmitted power from the two power amplifiers (Pas) can be added coherently at the desired target antenna to achieve twice the maximum power rated for each PA.

Figure 32:
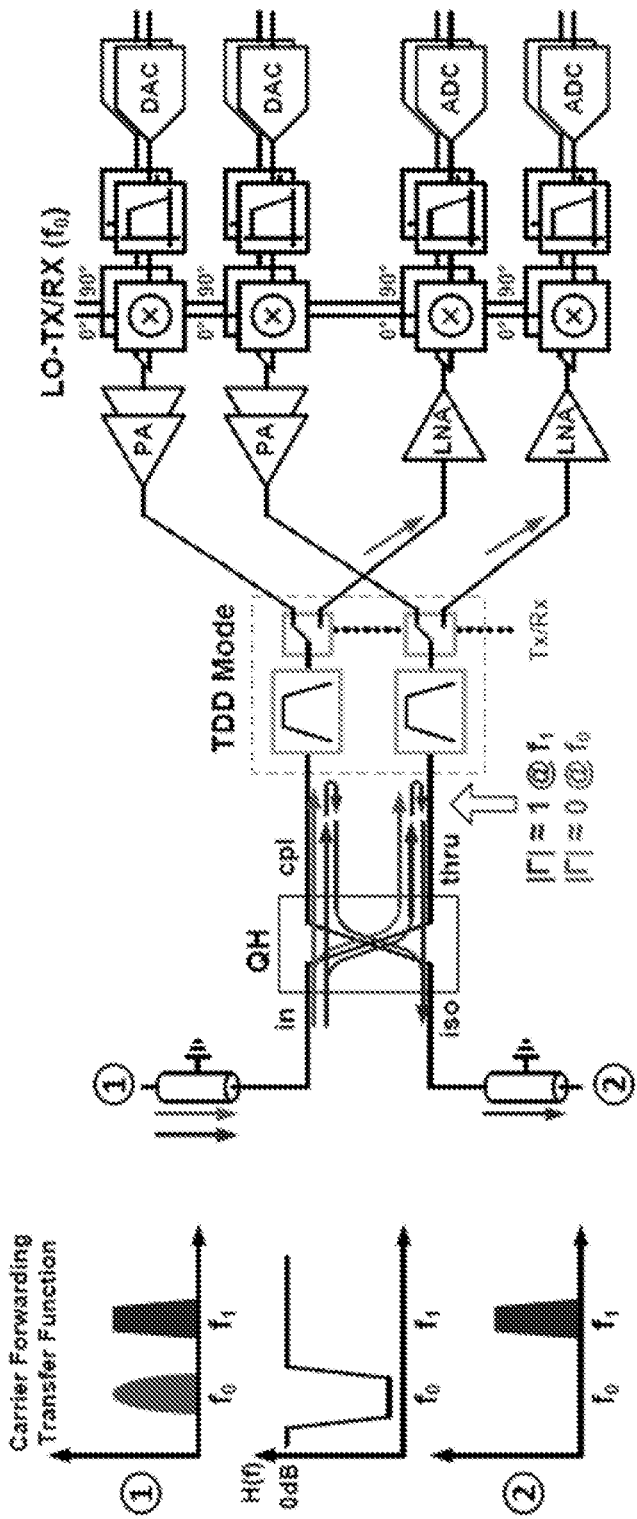
FIG. 32 is an example of the operation of a transceiver in accordance with some embodiments.

Turning to FIG. 32, an example of the operation of a transceiver in accordance with some embodiments is shown. As illustrated, the transceiver forwards RF carriers with frequency-selective load impedances. Due to the use of high-quality RF filters, the PA and LNAs generally only absorb signal power inside their operation frequency band. Since the filters typically have highly reflective out-of-band impedances and the quadrature hybrid has low loss, the out-of-band input carriers are forwarded to the iso port with low insertion loss. Due to reciprocity, out-of-band carriers fed into the iso port will also be forwarded to the in port. Note that the input port still maintains a wideband 50 ohm matched impedance with the carrier forwarding feature in place. Although FIG. 32 only illustrates TDD mode, FDD mode can also be used in some embodiments.

Figure 33:
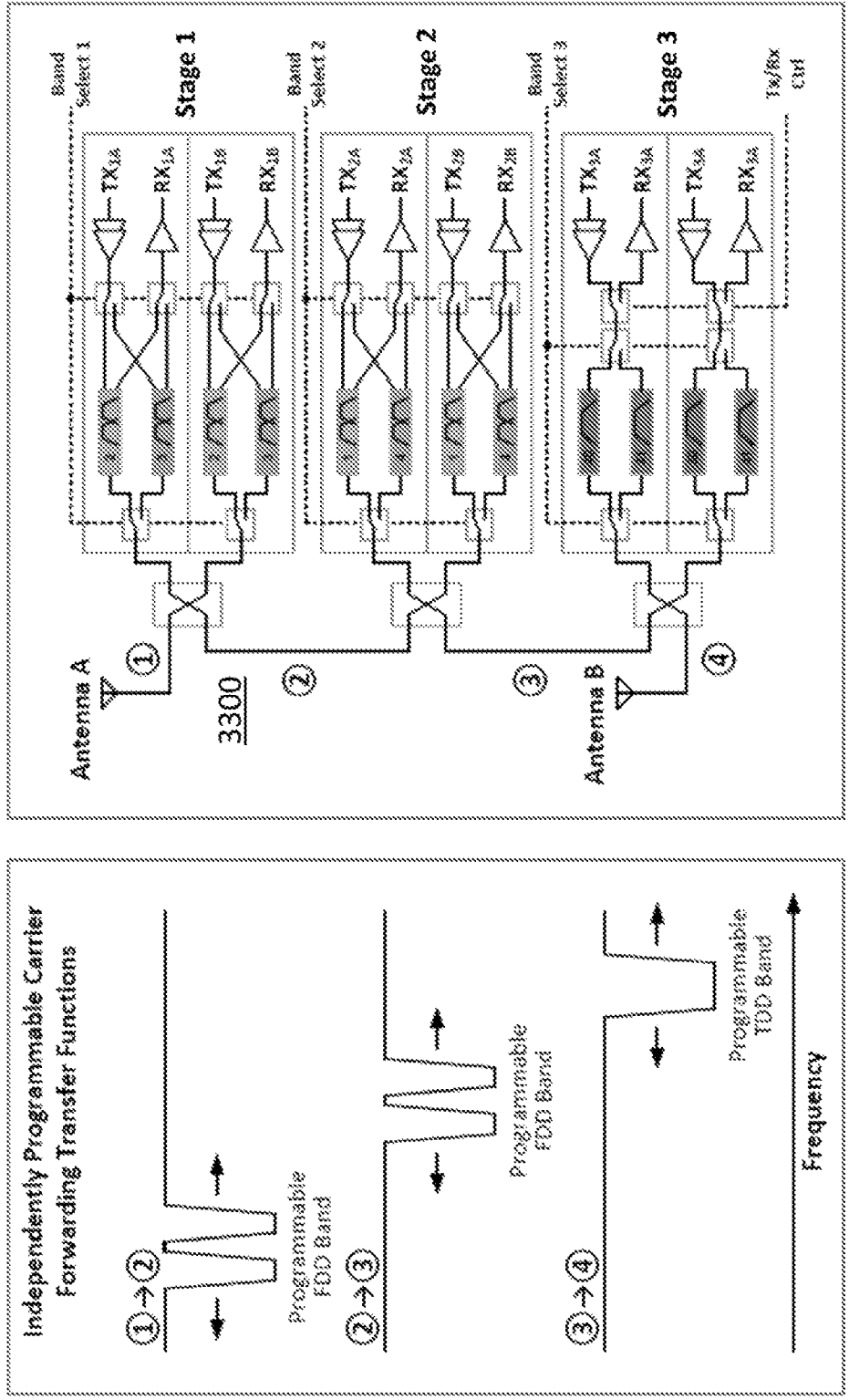
FIG. 33 is an example of a schematic of a carrier aggregation 2×2 MIMO transceiver in accordance with some embodiments.

By combining the wideband impedance-matched RF interface of FIG. 31 and the RF carrier forwarding of FIG. 32, transceiver sections can be daisy chained together to implement a programmable, modular receiver array for flexible carrier aggregation (CA). Shown in FIG. 33 is an example of a CA transceiver 3300 supporting up to three concurrent carriers. The transceiver includes three concurrent stages, each of which is similar to that shown in FIG. 31 with the exception that RF band selection switches are included to select the RF filter and the duplexers used by each transceiver stage.

Figure 34:
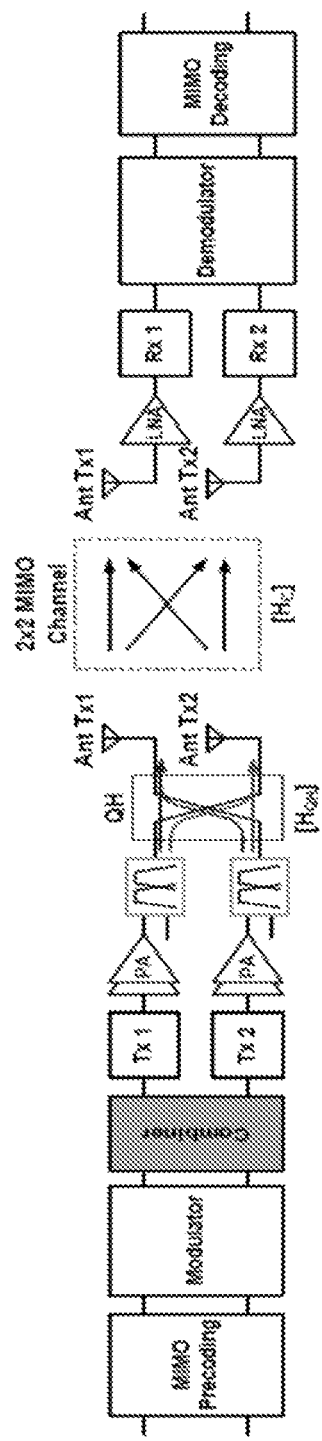
FIG. 34 is an example of a schematic of a transmitter and a receiver for a full 2×2 MIMO wireless link in accordance with some embodiments.
Figure 35:
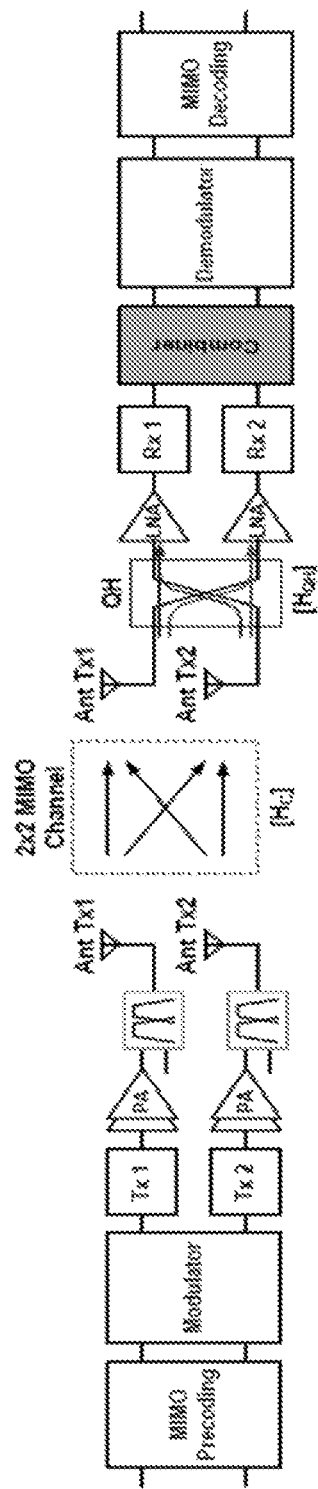
FIG. 35 is another example of a schematic of a transmitter and a receiver for a full 2×2 MIMO wireless link in accordance with some embodiments.

With RF power steering, the 2×2 MIMO transceiver shown in FIG. 32 can transmit and receive two independent signals at its two antennas. In this case, high isolation between the antenna ports can be realized with the assistance of DSP algorithms at the baseband circuits of the transmitters and receivers to calibrate out impairments such as magnitude and phase imbalance in the RF circuits. Assisted test signals can be applied to accurately measure the linear transfer matrix between the antennas and the transmitters or receivers. With such information, DSP algorithms can transmit independent signals on each antenna with the two transmitters and discriminate received signals from the two antennas with the two receivers. FIGS. 34 and 35 show examples of transmitters and receivers for a full 2×2 MIMO wireless link. More particularly, FIG. 34 shows an example of a 2×2 MIMO wireless link with a quadrature hybrid on the transmitter side. FIG. 35 shows an example of a 2×2 MIMO wireless link with a quadrature hybrid on the receiver side. The baseband combiners (implemented in either analog or digital baseband circuits) undo the RF domain signal combining introduced by the quadrature hybrid.

Figure 36:
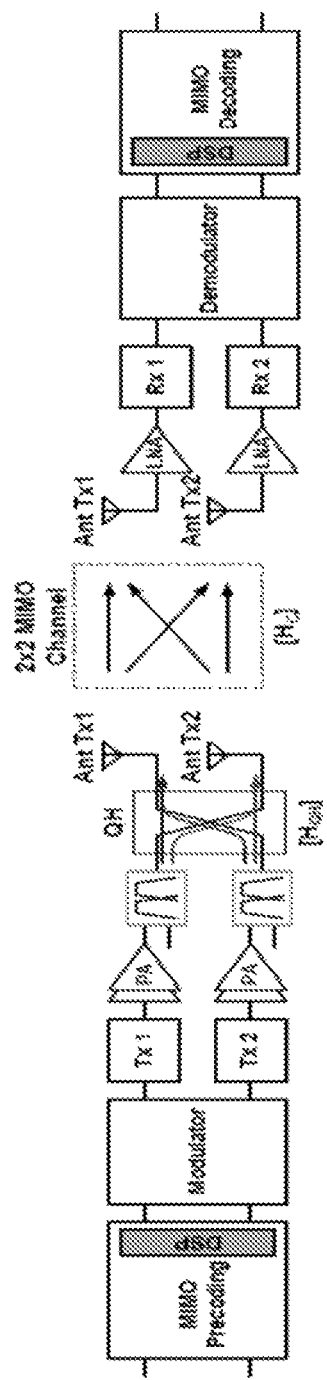
FIG. 36 is still another example of a schematic of a transmitter and a receiver for a full 2×2 MIMO wireless link in accordance with some embodiments.
Figure 37:
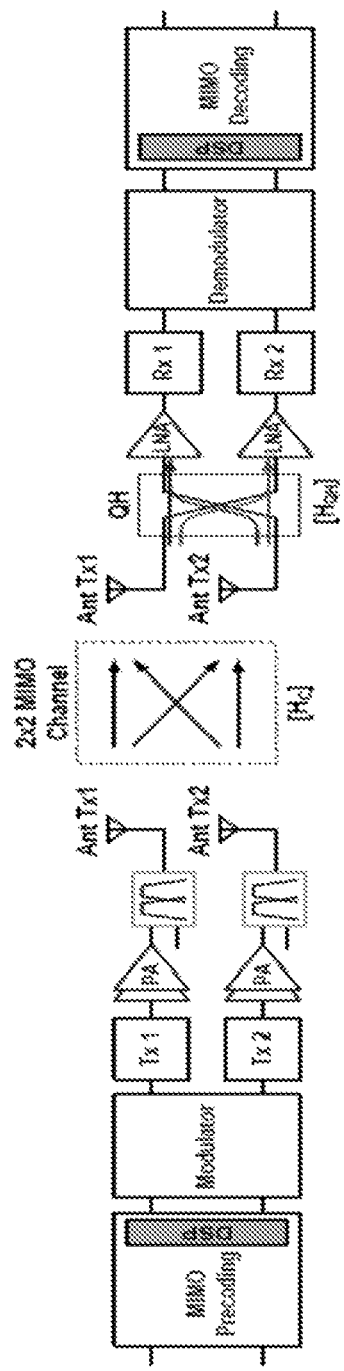
FIG. 37 is yet another example of a schematic of a transmitter and a receiver for a full 2×2 MIMO wireless link in accordance with some embodiments.

In some embodiments, rather than implementing the complex combiners as separate blocks as shown in FIGS. 34 and 35, the complex combiners can be co-designed and co-optimized with the digital MIMO modulators and demodulators. In some embodiments, the combiners can be merged with the MIMO precoding block and MIMO decoding block in a digital signal processor, respectively, as shown in FIGS. 36 and 37, as these blocks have similar hardware topologies and requirements.

Figure 38:
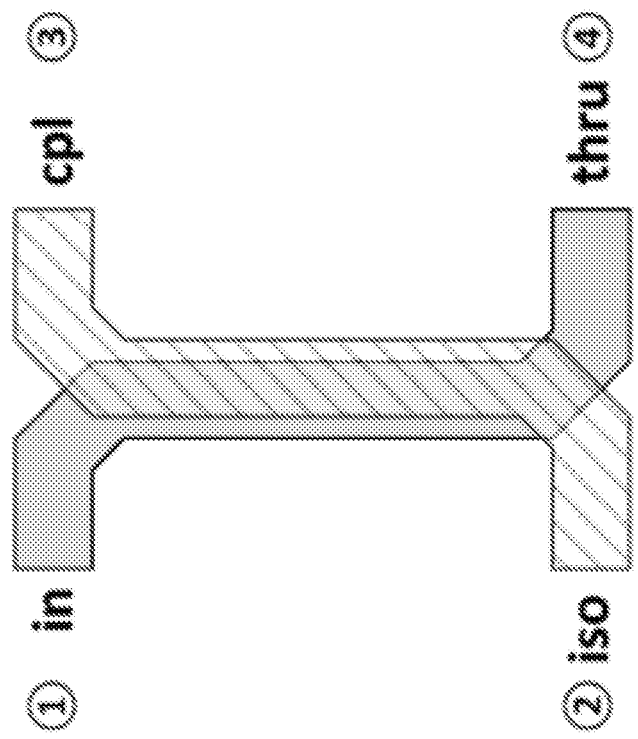
FIG. 38 is an example of an illustration quadrature hybrid implemented in stripline in accordance with some embodiments.
Figure 39:
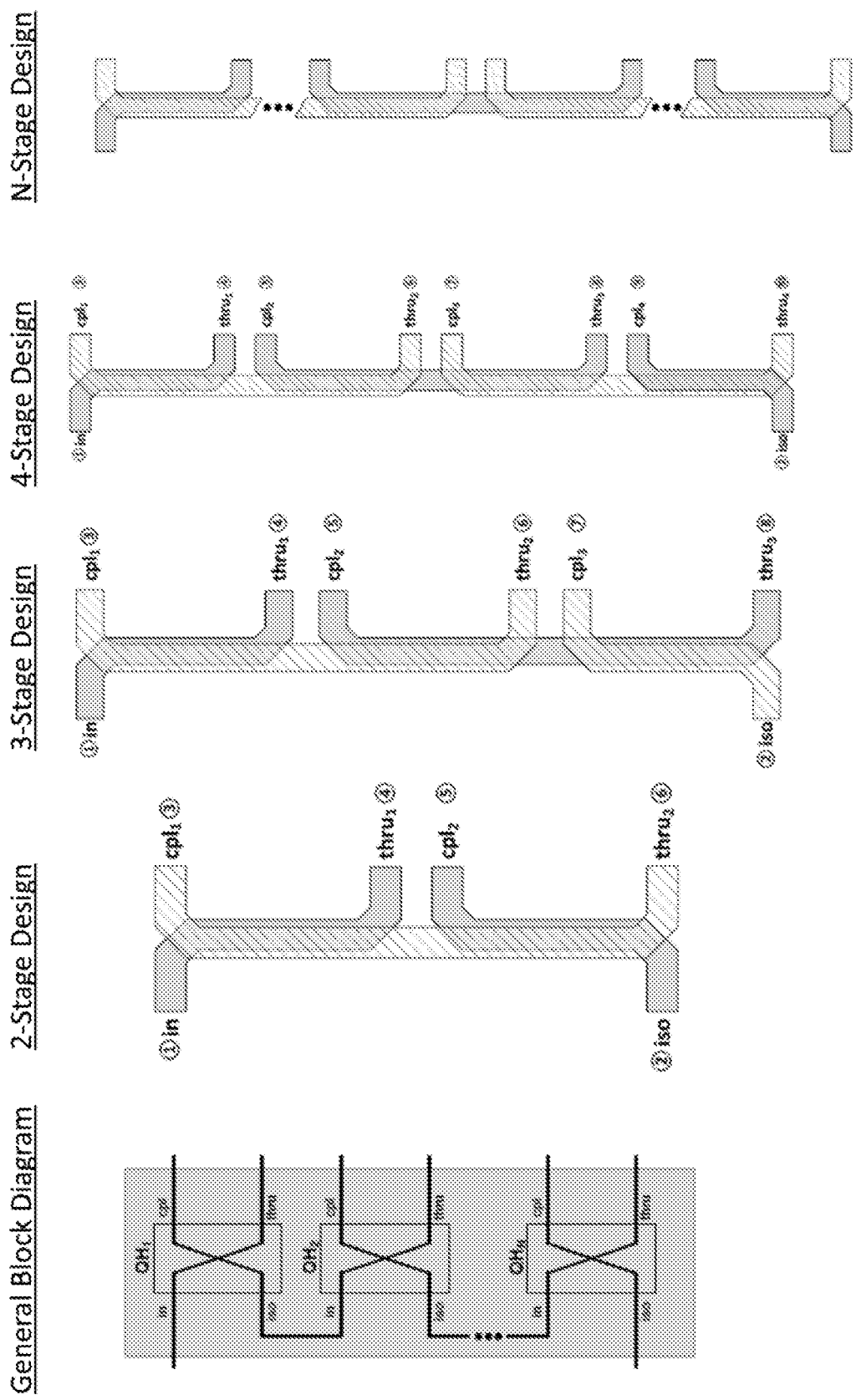
FIG. 39 is an example of an illustration of multi-stage quadrature hybrids implemented in stripline in accordance with some embodiments.
Figure 40:
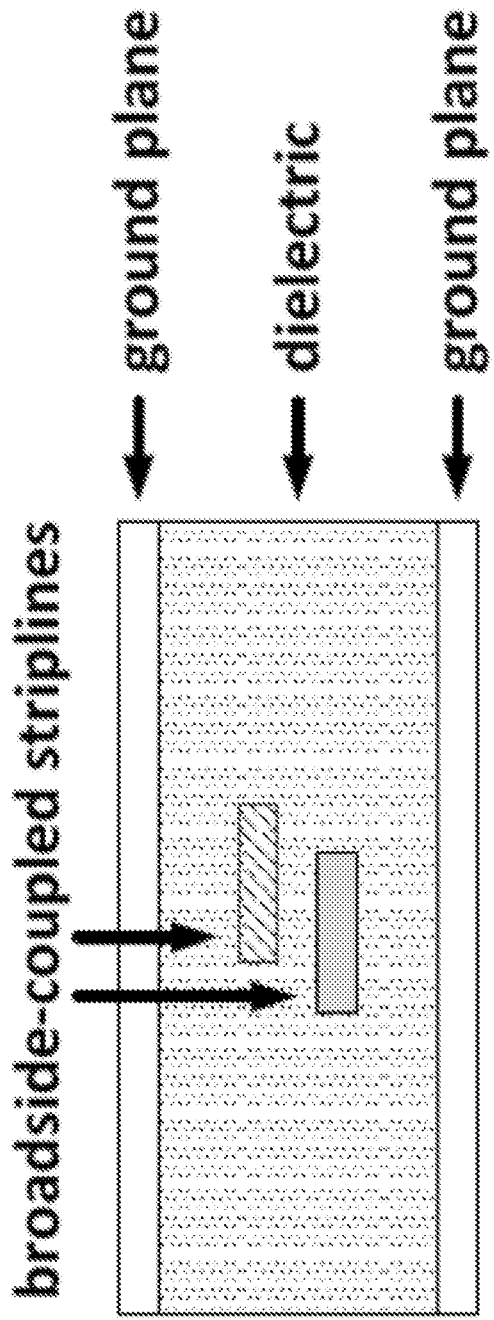
FIG. 40 is an example of an illustration of a cross section of a portion of a quadrature hybrid implemented in stripline in accordance with some embodiments.
Figure 41:
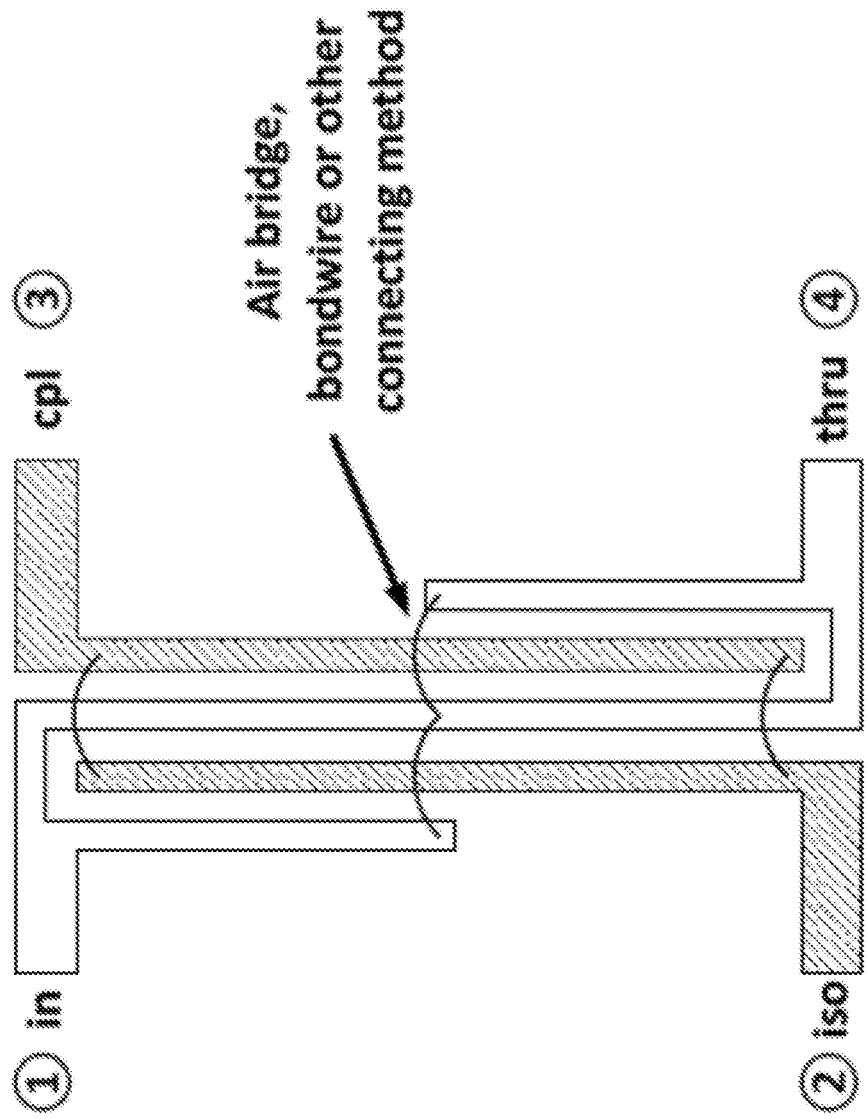
FIG. 41 is an example of an illustration quadrature hybrid implemented in microstrip in accordance with some embodiments.
Figure 42:
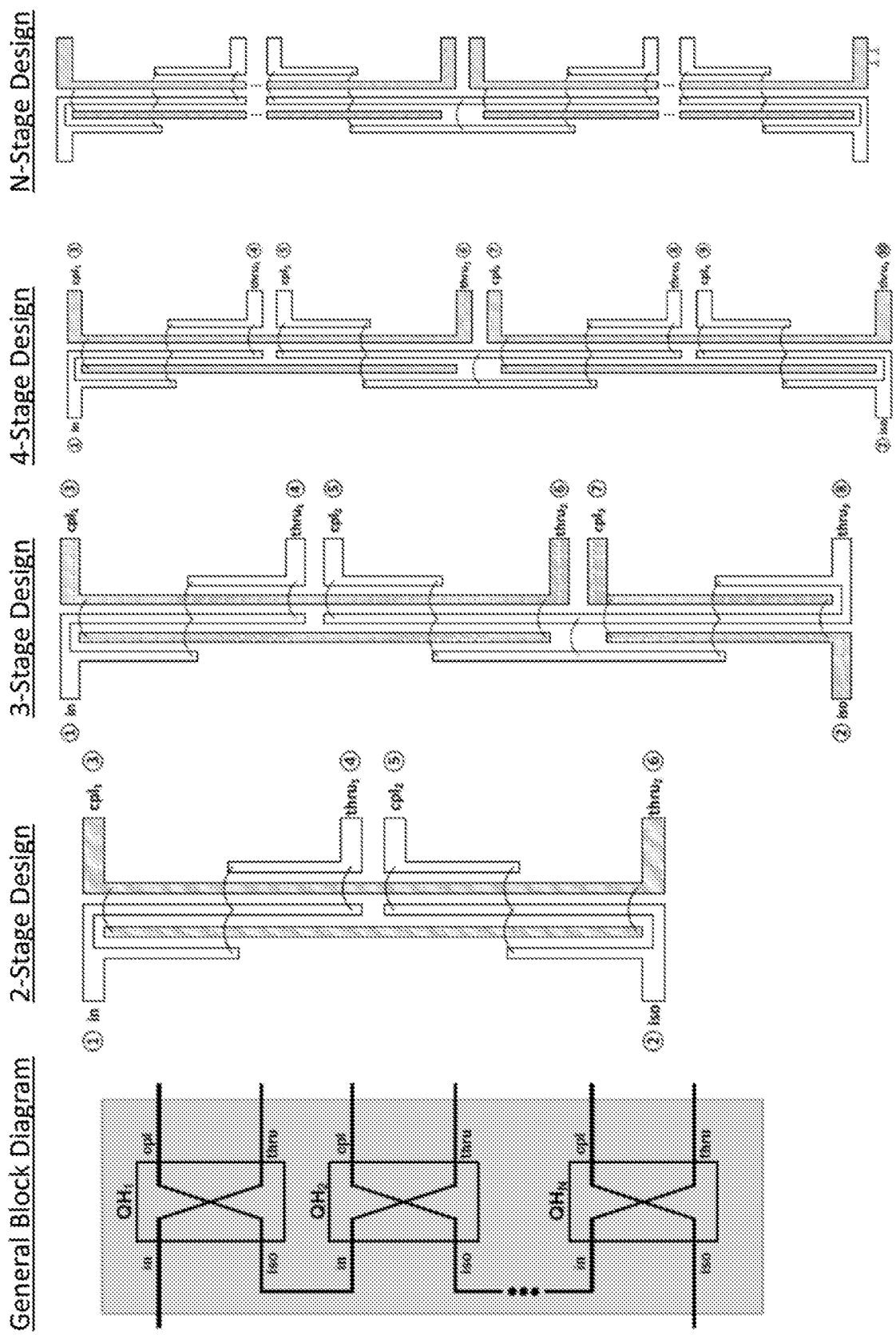
FIG. 42 is an example of an illustration of multi-stage quadrature hybrids implemented in microstrip in accordance with some embodiments.
Figure 43:
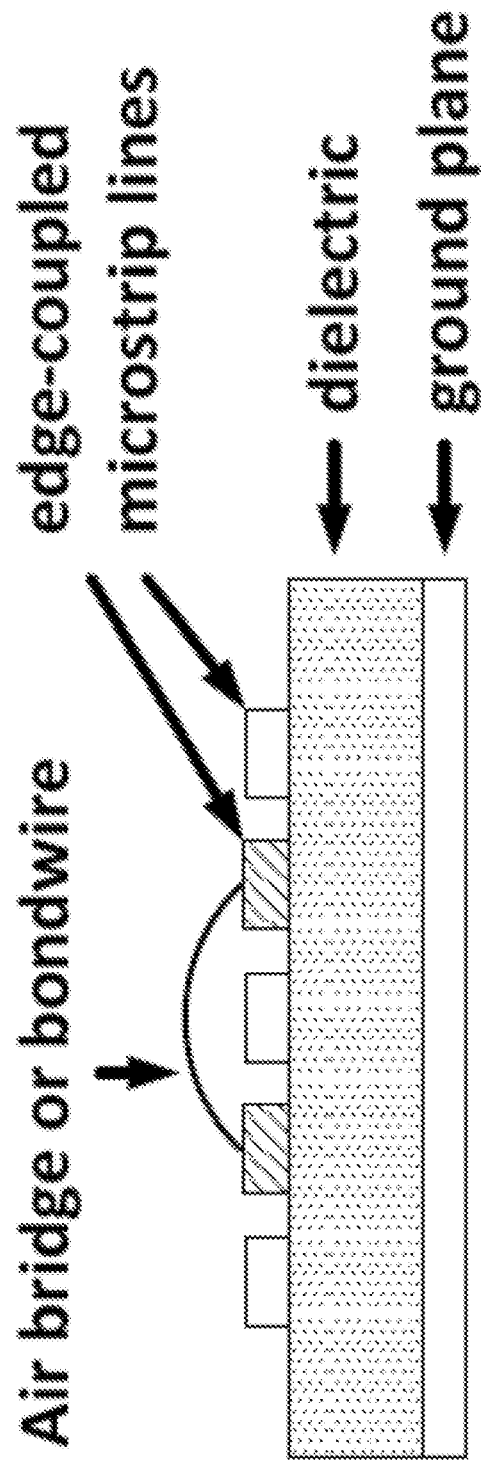
FIG. 43 is an example of a cross section of a portion of a quadrature hybrid implemented in microstrip in accordance with some embodiments.

Turning to FIGS. 38-43, illustrations of ways in which quadrature hybrids and daisy chains of two or more quadrature hybrids can be implemented in accordance with some embodiments are shown. More particularly, FIGS. 38-40 show examples of implementing one or more quadrature hybrids using stripline, and FIGS. 41-43 shown examples of implementing one or more quadrature hybrids using microstrip.

FIG. 38 shows an example of a single quadrature hybrid implemented using stripline, and FIG. 39 shows examples of a general block diagram of a daisy chain of quadrature hybrids, a 2-stage design of a daisy chain of quadrature hybrids, a 3-stage design of a daisy chain of quadrature hybrids, a 4-stage design of a daisy chain of quadrature hybrids, and an N-stage design of a daisy chain of quadrature hybrids, all using stripline, in accordance with some embodiment. As shown in FIG. 40, the striplines of FIGS. 38 and 39 can be implemented in two interconnection layers and dielectric layers between two ground planes.

FIG. 41 shows an example of a single quadrature hybrid implemented using microstrip, and FIG. 42 shows examples of a general block diagram of a daisy chain of quadrature hybrids, a 2-stage design of a daisy chain of quadrature hybrids, a 3-stage design of a daisy chain of quadrature hybrids, a 4-stage design of a daisy chain of quadrature hybrids, and an N-stage design of a daisy chain of quadrature hybrids, all using microstrip, in accordance with some embodiments. As shown in FIG. 43, the microstrip lines of FIGS. 41 and 42 can be implemented on an interconnection layer and a dielectric layer which sits on a ground plane, and airbridges or bondwires can be used to connect different sections of the microstrip lines.

Although the invention has been described and illustrated in the foregoing illustrative embodiments, it is understood that the present disclosure has been made only by way of example, and that numerous changes in the details of embodiment of the invention can be made without departing from the spirit and scope of the invention, which is limited only by the claims that follow. Features of the disclosed embodiments can be combined and rearranged in various ways.

What is claimed is:

1. A transceiver comprising:
a first quadrature hybrid having a first in port, a first iso port, a first cpl port, and a first thru port, wherein when a signal having a power is received at the first in port, a first half of the power of the signal is provided to the first cpl port as a first wave and a second half of the power of the signal is provided to the first thru port as a second wave, and wherein the first wave is shifted 90 degrees from the second wave;
an antenna coupled to the first in port externally from the first quadrature hybrid;
a first transmitter having an output coupled to the first cpl port externally from the first quadrature hybrid;
a first receiver having an input coupled to the first cpl port externally from the first quadrature hybrid;
a second transmitter having an output coupled to the first thru port externally from the first quadrature hybrid; and
a second receiver having an input coupled to the first thru port externally from the first quadrature hybrid.

2. The transceiver of claim 1, further comprising a switch that connects one of the output of the first transmitter and the input of the first receiver at a time to the first cpl port.

3. The transceiver of claim 1, further comprising a filter that couples the output of the first transmitter and the input of the first receiver to the first cpl port.

4. The transceiver of claim 1, further comprising:
a filter having a first side connected to the first cpl port and having a second side; and
a switch that connects one of the output of the first transmitter and the input of the first receiver at a time to the second side of the filter.

5. The transceiver of claim 1, wherein the first transmitter comprises:
a digital to analog converter (DAC) having an output;
a filter having an input coupled to the output of the DAC and having an output;
a mixer having an input coupled to the output of the filter and having an output; and
a power amplifier having an input coupled to the output of the mixer and having an output coupled to the first cpl port.

6. The transceiver of claim 1, wherein the first receiver comprises:
a low noise amplifier (LNA) having an input coupled to the first cpl port and having an output;
a mixer having an input coupled to the output of the LNA and having an output;
a filter having an input coupled to the output of the mixer and having an output; and
an analog to digital converter (ADC) having an input coupled to the output of the filter.

7. The transceiver of claim 1, further comprising a switch that connects one of the output of the second transmitter and the input of the second receiver at a time to the first thru port.

8. The transceiver of claim 1, further comprising a filter that couples the output of the second transmitter and the input of the second receiver to the first thru port.

9. The transceiver of claim 1, further comprising:
a filter having a first side connected to the first thru port and having a second side; and
a switch that connects one of the output of the second transmitter and the input of the second receiver at a time to the second side of the filter.

10. The transceiver of claim 1, wherein the second transmitter comprises:
a digital to analog converter (DAC) having an output;
a filter having an input coupled to the output of the DAC and having an output;
a mixer having an input coupled to the output of the filter and having an output; and
a power amplifier having an input coupled to the output of the mixer and having an output coupled to the first thru port.

11. The transceiver of claim 1, wherein the second receiver comprises:
a low noise amplifier (LNA) having an input coupled to the first thru port and having an output;
a mixer having an input coupled to the output of the LNA and having an output;
a filter having an input coupled to the output of the mixer and having an output; and
an analog to digital converter (ADC) having an input coupled to the output of the filter.

12. The transceiver of claim 1 further comprising:
a complex Cartesian combiner coupled to the first receiver and the second receiver.

13. The transceiver of claim 1 further comprising a second quadrature hybrid having a second in port, a second iso port, a second cpl port, and a second thru port, wherein the second in port is coupled to the first iso port.

* * * * *